(12) United States Patent
Zhu et al.

(10) Patent No.: US 12,379,026 B2
(45) Date of Patent: Aug. 5, 2025

(54) MECHANICAL-ELECTRICAL-HYDRAULIC HYBRID TRANSMISSION DEVICE AND CONTROL METHOD THEREOF

(71) Applicant: JIANGSU UNIVERSITY, Zhenjiang (CN)

(72) Inventors: Zhen Zhu, Zhenjiang (CN); Jie Sheng, Zhenjiang (CN); Yingfeng Cai, Zhenjiang (CN); Long Chen, Zhenjiang (CN); Changgao Xia, Zhenjiang (CN); Haobin Jiang, Zhenjiang (CN); Xiang Tian, Zhenjiang (CN); Jiangyi Han, Zhenjiang (CN); Jianguo Zhu, Zhenjiang (CN); Falin Zeng, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/277,229

(22) PCT Filed: Jun. 9, 2022

(86) PCT No.: PCT/CN2022/097759
§ 371 (c)(1),
(2) Date: Aug. 2, 2024

(87) PCT Pub. No.: WO2023/236127
PCT Pub. Date: Dec. 14, 2023

(65) Prior Publication Data
US 2025/0155017 A1   May 15, 2025

(30) Foreign Application Priority Data
Jun. 7, 2022   (CN) .......................... 202210635240.3

(51) Int. Cl.
*F16H 61/40*   (2010.01)
*F16H 47/04*   (2006.01)
(Continued)

(52) U.S. Cl.
CPC ............. *F16H 61/26* (2013.01); *F16H 47/04* (2013.01); *F16H 61/00* (2013.01); *F16H 61/40* (2013.01); *F16H 61/686* (2013.01); *F16H 59/40* (2013.01)

(58) Field of Classification Search
CPC .......... F16H 61/26; F16H 47/04; F16H 61/00; F16H 61/40; F16H 61/686; F16H 59/40
See application file for complete search history.

(56) References Cited

U.S. PATENT DOCUMENTS 11,493,119 B1 * 11/2022 Profumo ................. F16H 47/04
2009/0088290 A1    4/2009 Tabata et al.

FOREIGN PATENT DOCUMENTS

CN    103660910 A      3/2014
CN    103770623 A  *   5/2014
(Continued)

*Primary Examiner* — Justin Holmes
(74) *Attorney, Agent, or Firm* — Bayramoglu Law Offices LLC

(57) ABSTRACT

A mechanical-electrical-hydraulic composite transmission device and a control method thereof are provided. The device includes an input shaft assembly, a power-split assembly, a hydraulic transmission assembly, an electrical variable transmission assembly, a mechanical transmission assembly, a power-convergence assembly, and an output shaft. Three types of transmission modes including single transmission modes, power-split composite transmission modes, and power-convergence composite transmission modes are implemented by controlling engagement and disengagement of clutches and a brake. Free switching between various transmission modes is realized, the requirements of engineering machinery for a transmission device (Continued)

with multiple modes in different working conditions are satisfied, the engine power utilization is improved, and the fuel economy is increased. The shift impact is effectively reduced and the speed ratio adjustment range is expanded. The hydraulic transmission enables quick startup and stable operation and implements speed variation and direction change easily and rapidly without causing impact.

10 Claims, 15 Drawing Sheets

(51) Int. Cl.
*F16H 61/00* (2006.01)
*F16H 61/26* (2006.01)
*F16H 61/686* (2006.01)
F16H 59/40 (2006.01)

(56) References Cited

FOREIGN PATENT DOCUMENTS

| | | |
|---|---|---|
| CN | 109185417 A | 1/2019 |
| CN | 110953318 A | 4/2020 |
| CN | 111946792 A | 11/2020 |
| CN | 113137462 A | 7/2021 |
| CN | 114001139 A | 2/2022 |
| EP | 3002146 A1 | 4/2016 |
| EP | 3078881 A1 * | 10/2016 |
| JP | 4162359 B2 * | 10/2008 |

* cited by examiner

MECHANICAL-ELECTRICAL-HYDRAULIC HYBRID TRANSMISSION DEVICE AND CONTROL METHOD THEREOF

CROSS REFERENCE TO THE RELATED APPLICATIONS

This application is the national phase entry of International Application No. PCT/CN2022/097759, filed on Jun. 9, 2022, which is based upon and claims priority to Chinese Patent Application No. 202210635240.3, filed on Jun. 7, 2022, the entire contents of which are incorporated herein by reference.

TECHNICAL FIELD

The present disclosure relates to a transmission device and a control method thereof, and in particular, to a mechanical-electrical-hydraulic composite transmission device integrating mechanical, hydraulic, and electrical transmission modes and control methods thereof, which belong to the technical field of variable transmission devices.

BACKGROUND

China is a large energy-consuming country with a shortage of oil resources, most of which are consumed by vehicles. As the country pays more and more attention to energy conservation and emission reduction, fuel saving of agricultural machinery is increasingly highlighted. The running conditions of agricultural machinery at work are worse than those of road vehicles and sudden increases in resistance usually occur. Low-power agricultural machinery often has to sacrifice certain operating efficiency to overcome these extreme conditions, and fuel consumption will increase consequently; while high-power agricultural machinery has problems such as high cost and large size, and excess power exists under relatively good operating conditions.

Variable transmission modes currently used in engineering machinery generally include gear single-flow transmission, hydraulic single-flow transmission, and hydraulic-gear composite transmission. The gear single-flow transmission has high efficiency, but the transmission ratio is fixed and frequent shifts are required during operation. The hydraulic single-flow transmission can easily realize stepless speed regulation and enables high torque transmission, but the transmission efficiency is low. The hydraulic-gear composite transmission is a transmission mode that combines hydraulic power flow and mechanical power flow in parallel, and achieves both high efficiency in gear transmission and high torque in hydraulic transmission; however, it has high requirements for a variable displacement hydraulic pump, a fixed displacement hydraulic motor, and a hydraulic system. The composite electrical variable transmission can not only meet the requirements of power coupling, but also realize functions such as brake feedback, stepless speed variation, and power compensation. Besides, it can output different speeds and torques and flexibly realize conversion between various forms of energy.

The prior art only relates to the designs of single-flow transmission devices and composite transmission devices that combine two types of single-flow transmissions in parallel, and fails to fully satisfy the design requirements of engineering machinery for transmission devices with multiple modes, especially multiple composite modes, in different working conditions.

SUMMARY

To eliminate the defects in the prior art, the present disclosure provides a mechanical-electrical-hydraulic composite transmission device and a control method thereof, so that switching between multiple modes including hydraulic transmission, mechanical transmission, electrical variable transmission, mechanical-electrical convergence transmission, hydraulic-mechanical split transmission, hydraulic-electrical split transmission, hydraulic-mechanical-electrical split transmission, hydraulic-mechanical convergence transmission, hydraulic-electrical convergence transmission, and mechanical-hydraulic-electrical convergence transmission is implemented through engagement and disengagement of a clutch assembly and a brake assembly, thereby satisfying the requirements of engineering machinery for a transmission device with multiple modes in different working conditions.

A mechanical-electrical-hydraulic composite transmission device is provided, which includes:
  an input shaft assembly including an input shaft and a first clutch $C_1$;
  a power-split assembly including a power-split assembly input shaft, a first gear pair, a second clutch $C_2$, a power-split assembly ring gear, a power-split assembly planet carrier, and a power-split assembly sun gear, where the power-split assembly ring gear is connected to the power-split assembly input shaft, the power-split assembly input shaft is connected to the input shaft through the first clutch $C_1$, and the power-split assembly ring gear is connected to the power-split assembly planet carrier through the second clutch $C_2$;
  a hydraulic transmission assembly including a third clutch $C_3$, a variable displacement pump, a hydraulic pipe, a fixed displacement motor, a second gear pair, and a fourth clutch $C_4$, where an input end of the hydraulic transmission assembly is connected to the power-split assembly sun gear, the input end of the hydraulic transmission assembly is connected to the variable displacement pump through the third clutch $C_3$, the variable displacement pump outputs high-pressure oil to the fixed displacement motor through the hydraulic pipe, and the second gear pair is connected to an output shaft of the fixed displacement motor through the fourth clutch $C_4$;
  an electrical variable transmission assembly including a fifth clutch $C_5$, a third gear pair, an electrical variable transmission input shaft, an electrical variable transmission, and an electrical variable transmission output shaft, where the power-split assembly planet carrier is connected to the electrical variable transmission input shaft through the fifth clutch $C_5$;
  a mechanical transmission assembly including a fourth gear pair, a sixth clutch $C_6$, a brake B, a mechanical transmission assembly input shaft, a fifth gear pair, a seventh clutch $C_7$, a mechanical transmission assembly ring gear, a mechanical transmission assembly sun gear, an eighth clutch $C_8$, a mechanical transmission assembly planet carrier, and a mechanical transmission assembly output shaft, where the electrical variable transmission output shaft is connected to the mechanical transmission assembly sun gear through the sixth clutch $C_6$, the brake B is connected to the mechanical transmission assembly sun gear, the power-split assembly planet carrier is connected to the mechanical transmission assembly ring gear through the seventh clutch $C_7$, and the mechanical transmission assembly sun gear is connected to the mechanical transmission assembly planet carrier through the eighth clutch $C_8$;

a power-convergence assembly including a power-convergence assembly ring gear, a power-convergence assembly sun gear, a power-convergence assembly planet carrier, and a ninth clutch $C_9$, where the power-convergence assembly ring gear is fixedly connected to the mechanical transmission assembly output shaft, the power-convergence assembly ring gear is connected to the power-convergence assembly planet carrier through the ninth clutch $C_9$, and the power-convergence assembly sun gear is connected to an output end of the hydraulic transmission assembly;

an output shaft, where the output shaft is connected to the power-convergence assembly planet carrier.

According to the present disclosure, switching between multiple modes including hydraulic transmission, mechanical transmission, electrical variable transmission, mechanical-electrical convergence transmission, hydraulic-mechanical split transmission, hydraulic-electrical split transmission, hydraulic-mechanical-electrical split transmission, hydraulic-mechanical convergence transmission, hydraulic-electrical convergence transmission, and mechanical-hydraulic-electrical convergence transmission is implemented through engagement and disengagement of the clutch assembly and the brake assembly, so that the requirements of engineering machinery for a transmission device with multiple modes in different working conditions are satisfied, the engine power utilization is improved, and the fuel economy is increased. The shift impact is effectively reduced and the speed ratio adjustment range is expanded. The hydraulic transmission enables quick startup and stable operation and implements speed variation and direction change easily and rapidly without causing impact. The electrical variable transmission has a continuously changing transmission ratio and causes extremely small impact on the mechanism during operation. The speed regulation range is effectively expanded and the requirement of nonlinear stepless speed regulation within a large range is satisfied. The hydraulic-electrical composite transmission modes and the mechanical-hydraulic-electrical composite transmission modes improve the system transmission efficiency and meet the requirement of regional high-efficiency stepless speed regulation.

A control method of the mechanical-electrical-hydraulic composite transmission device is provided to implement three types of transmission modes including single transmission modes, power-split composite transmission modes, and power-convergence composite transmission modes by controlling engagement and disengagement of the clutches and the brake B, where the single transmission modes include a hydraulic transmission mode, a mechanical transmission mode, and an electrical variable transmission mode; the power-split composite transmission modes include a hydraulic-mechanical split transmission mode, a hydraulic-electrical split transmission mode, and a hydraulic-mechanical-electrical split transmission mode; and the power-convergence composite transmission modes include a mechanical-electrical convergence transmission mode, a hydraulic-mechanical convergence transmission mode, a hydraulic-electrical convergence transmission mode, and a mechanical-hydraulic-electrical convergence transmission mode.

The engaged components in each transmission mode are shown in Table 1. The details are as follows:

TABLE 1

Engagement state of mode-switching components

| | | State of execution components | | | | | | | | | | Input-output speed |
|---|---|---|---|---|---|---|---|---|---|---|---|---|
| Type | Mode | $C_1$ | $C_2$ | $C_3$ | $C_4$ | $C_5$ | $C_6$ | $C_7$ | $C_8$ | $C_9$ | B | relationship |
| Single transmission modes | Hydraulic transmission | 1 | 1 | 1 | 1 | | | | | | 1 | $n_o = \dfrac{e}{i_1 i_2} n_I$ |
| | Mechanical transmission | 1 | 1 | | | | | 1 | | 1 | 1 | $n_o = \dfrac{k_2}{(1+k_2)i_5} n_I$ |
| | Electrical variable transmission | 1 | 1 | | | 1 | 1 | | 1 | 1 | | $n_o = \dfrac{1}{i_3 i_4 i_e} n_I$ |
| Power-split transmission | Hydraulic-mechanical split transmission | 1 | | 1 | 1 | | | 1 | | 1 | 1 | $n_o = \dfrac{k_1}{\dfrac{(1+k_2)i_5(1+k_1)}{k_2} - \dfrac{i_1 i_2}{e}} n_I$ |
| | Hydraulic-electrical split transmission | 1 | | 1 | 1 | 1 | 1 | | 1 | 1 | | $n_o = \dfrac{k_1}{i_3 i_4 i_e(1+k_1) - \dfrac{i_1 i_2}{e}} n_I$ |

TABLE 1-continued

Engagement state of mode-switching components

| Type | Mode | State of execution components | | | | | | | | | | Input-output speed relationship |
|---|---|---|---|---|---|---|---|---|---|---|---|---|
| | | $C_1$ | $C_2$ | $C_3$ | $C_4$ | $C_5$ | $C_6$ | $C_7$ | $C_8$ | $C_9$ | B | |
| | Hydraulic-mechanical-electrical split transmission | 1 | | 1 | 1 | 1 | 1 | 1 | | 1 | | $n_o = \dfrac{k_1}{\dfrac{(1+k_2)(1+k_1)}{\dfrac{1}{i_3 i_4 i_e} + \dfrac{k_2}{i_5}} - \dfrac{i_1 i_2}{e}} n_I$ |
| Power-convergence transmission | Mechanical-electrical convergence transmission | 1 | 1 | | | 1 | 1 | 1 | | 1 | | $n_o = \dfrac{\dfrac{1}{i_3 i_4 i_e} + \dfrac{k_2}{i_5}}{(1+k_2)} n_I$ |
| | Hydraulic-mechanical convergence transmission mode | 1 | 1 | 1 | 1 | | | 1 | | | 1 | $n_o = \dfrac{\dfrac{k_2 k_3}{(1+k_2)i_5} + \dfrac{e}{i_1 i_2}}{(1+k_3)} n_I$ |
| | Hydraulic-electrical convergence transmission | 1 | 1 | 1 | 1 | 1 | 1 | | 1 | | | $n_o = \dfrac{\dfrac{k_3}{i_3 i_4 i_e} + \dfrac{e}{i_1 i_2}}{(1+k_3)} n_I$ |
| | Mechanical-hydraulic-electrical convergence transmission | 1 | 1 | 1 | 1 | 1 | 1 | 1 | | | | $n_o = \dfrac{\dfrac{\dfrac{1}{i_3 i_4 i_e} + \dfrac{k_2}{i_5}}{(1+k_2)} + \dfrac{e}{i_1 i_2}}{(1+k_3)} n_I$ |

Preferably, the single transmission modes are controlled by the following methods:

in the hydraulic transmission mode, engaging the first clutch $C_1$, the second clutch $C_2$, the third clutch $C_3$, the fourth clutch $C_4$, and the ninth clutch $C_9$, while disengaging the fifth clutch $C_5$, the sixth clutch $C_6$, the seventh clutch $C_7$, the eighth clutch $C_8$, and the brake B, so that power is input from the input shaft and then passes through the first gear pair to drive the variable displacement pump to work, the variable displacement pump outputs high-pressure oil to drive the fixed displacement motor to rotate, and the power output from the output end of the fixed displacement motor is transmitted through the second gear pair and then output from the output shaft;

in the mechanical transmission mode, engaging the first clutch $C_1$, the second clutch $C_2$, the seventh clutch $C_7$, the ninth clutch $C_9$, and the brake B while disengaging the third clutch $C_3$, the fourth clutch $C_4$, the fifth clutch $C_5$, the sixth clutch $C_6$, and the eighth clutch $C_8$, so that power is input from the input shaft and then sequentially passes through the first clutch $C_1$, the second clutch $C_2$, and the seventh clutch $C_7$ to drive the mechanical transmission assembly ring gear to work, and the power output from the mechanical transmission assembly ring gear is transmitted through the mechanical transmission assembly planet carrier and then output from the output shaft;

in the electrical variable transmission mode, engaging the first clutch $C_1$, the second clutch $C_2$, the fifth clutch $C_5$, the sixth clutch $C_6$, the eighth clutch $C_8$, and the ninth clutch $C_9$ while disengaging the third clutch $C_3$, the fourth clutch $C_4$, the seventh clutch $C_7$, and the brake B, where the power-split assembly and the power-convergence assembly are each fixedly connected as a whole, so that power is input from the input shaft, then transmitted through the power-split assembly, the electrical variable transmission assembly, and the power-convergence assembly, and output from the output shaft.

Preferably, the power-split composite transmission modes are controlled by the following methods:

in the hydraulic-mechanical split transmission mode, engaging the first clutch $C_1$, the third clutch $C_3$, the fourth clutch $C_4$, the seventh clutch $C_7$, the ninth clutch $C_9$, and the brake B while disengaging the second clutch $C_2$, the fifth clutch $C_5$, the sixth clutch $C_6$, and the eighth clutch $C_8$, so that power is input from the input shaft, then passes through the power-split assembly input shaft to the power-split assembly ring gear, and is split into two parts: one part of the power is transmitted through the power-split assembly sun gear and the hydraulic transmission assembly to the power-convergence assembly sun gear, while the other part of the power is transmitted through the power-split assembly planet carrier, the mechanical transmission assembly ring gear, and the mechanical transmission assembly planet carrier to the power-convergence assembly ring gear; since the power-convergence assembly is fixedly connected as a whole, the power transmitted to the power-convergence assembly sun gear and the power transmitted to the power-convergence assembly ring gear pass through the power-convergence assembly and are output from the output shaft;

in the hydraulic-electrical split transmission mode, engaging the first clutch $C_1$, the third clutch $C_3$, the fourth clutch $C_4$, the fifth clutch $C_5$, the sixth clutch $C_6$, the eighth clutch $C_8$, and the ninth clutch $C_9$ while disengaging the second clutch $C_2$, the seventh clutch $C_7$, and the brake B, so that power is input from the input shaft, then passes through the power-split assembly input shaft to the power-split assembly ring gear, and is split into two parts: one part of the power is transmitted through the power-split assembly sun gear and the hydraulic transmission assembly to the power-convergence assembly sun gear, while the other part of the power is transmitted through the power-split assembly planet carrier to the electrical variable transmission input shaft, the electrical variable transmission input shaft drives the electrical variable transmission to work, and the power output by the electrical variable transmission is transmitted through the electrical variable transmission output shaft to the power-convergence assembly ring gear; since the power-convergence assembly is fixedly connected as a whole, the power transmitted to the power-convergence assembly sun gear and the power transmitted to the power-convergence assembly ring gear pass through the power-convergence assembly and are output from the output shaft;

in the hydraulic-mechanical-electrical split transmission mode, engaging the first clutch $C_1$, the third clutch $C_3$, the fourth clutch $C_4$, the fifth clutch $C_5$, the sixth clutch $C_6$, the seventh clutch $C_7$, and the ninth clutch $C_9$ while disengaging the second clutch $C_2$, the eighth clutch $C_8$, and the brake B, so that power is input from the input shaft, then passes through the power-split assembly input shaft to the power-split assembly ring gear, and is split into two parts: one part of the power is transmitted through the power-split assembly sun gear and the hydraulic transmission assembly to the power-convergence assembly sun gear, while the other part of the power passes through the power-split assembly planet carrier and is split again, where one part of the power is transmitted through the fifth clutch $C_5$ to the electrical variable transmission input shaft, the electrical variable transmission input shaft drives the electrical variable transmission to work, and the power output by the electrical variable transmission is transmitted through the electrical variable transmission output shaft to the mechanical transmission assembly sun gear; while the other part of the power is transmitted through the seventh clutch $C_7$ to the mechanical transmission assembly ring gear, the two parts of the power are converged at the mechanical transmission assembly planet carrier, and the power after convergence is transmitted to the power-convergence assembly ring gear; since the power-convergence assembly is fixedly connected as a whole, the power transmitted to the power-convergence assembly sun gear and the power transmitted to the power-convergence assembly ring gear pass through the power-convergence assembly and are output from the output shaft.

Preferably, the power-convergence composite transmission modes are controlled by the following methods:

in the mechanical-electrical convergence transmission mode, engaging the first clutch $C_1$, the second clutch $C_2$, the fifth clutch $C_5$, the sixth clutch $C_6$, the seventh clutch $C_7$, and the ninth clutch $C_9$ while disengaging the third clutch $C_3$, the fourth clutch $C_4$, the eighth clutch $C_8$, and the brake B, where the power-split assembly and the power-convergence assembly are each fixedly connected as a whole, so that power is input from the input shaft, then passes through the power-split assembly, and is split into two parts: one part of the power is transmitted through the fifth clutch $C_5$ to the electrical variable transmission input shaft, the electrical variable transmission input shaft drives the electrical variable transmission to work, and the power output by the electrical variable transmission is transmitted through the electrical variable transmission output shaft to the mechanical transmission assembly sun gear; while the other part of the power is transmitted through the seventh clutch $C_7$ to the mechanical transmission assembly ring gear, the two parts of the power are converged at the mechanical transmission assembly planet carrier, and the power after convergence is transmitted through the power-convergence assembly and then output from the output shaft;

in the hydraulic-mechanical convergence transmission mode, engaging the first clutch $C_1$, the second clutch $C_2$, the third clutch $C_3$, the fourth clutch $C_4$, the seventh clutch $C_7$, and the brake B while disengaging the fifth clutch $C_5$, the sixth clutch $C_6$, and the ninth clutch $C_9$, where the power-split assembly is fixedly connected as a whole, so that power is input from the input shaft, then passes through the power-split assembly, and is split into two parts: one part of the power is transmitted through the hydraulic transmission assembly to the power-convergence assembly sun gear, while the other part of the power is transmitted through the power-split assembly planet carrier, the mechanical transmission assembly ring gear, and the mechanical transmission assembly planet carrier to the power-convergence assembly ring gear; the power transmitted to the power-convergence assembly sun gear and the power transmitted to the power-convergence assembly ring gear are converged at the power-convergence assembly planet carrier and then output from the output shaft;

in the hydraulic-electrical convergence transmission mode, engaging the first clutch $C_1$, the second clutch $C_2$, the third clutch $C_3$, the fourth clutch $C_4$, the fifth clutch $C_5$, the sixth clutch $C_6$, and the eighth clutch $C_8$ while disengaging the seventh clutch $C_7$, the ninth clutch $C_9$, and the brake B, where the power-split assembly is fixedly connected as a whole, so that power is input from the input shaft, then passes through the power-split assembly, and is split into two parts: one part of the power is transmitted through the hydraulic transmission assembly to the power-convergence assembly sun gear, while the other part of the power is transmitted through the power-split assembly planet carrier to the electrical variable transmission input shaft, the electrical variable transmission input shaft drives the electrical variable transmission to work, and the power output by the electrical variable transmission is transmitted through the electrical variable transmission output shaft to the power-convergence assembly ring gear; the power transmitted to the power-convergence assembly sun gear and the power transmitted to the power-convergence assembly ring gear are converged at the power-convergence assembly planet carrier and then output from the output shaft;

in the mechanical-hydraulic-electrical convergence transmission mode, engaging the first clutch $C_1$, the second clutch $C_2$, the third clutch $C_3$, the fourth clutch $C_4$, the fifth clutch $C_5$, the sixth clutch $C_6$, and the seventh clutch $C_7$ while disengaging the eighth clutch $C_8$, the ninth clutch $C_9$, and the brake B, where the power-split assembly is fixedly connected as a whole, so that power is input from the input shaft, then passes through the power-split assembly, and is split into two parts: one part of the power is transmitted through the hydraulic transmission assembly to the power-convergence assembly sun gear, while the other part of the power passes through the power-split assembly planet carrier and is split again, where one part of the power is transmitted through the fifth clutch $C_5$ to the electrical variable transmission input shaft, the electrical variable transmission input shaft drives the electrical variable transmission to work, and the power output by the electrical variable transmission is transmitted through the electrical variable transmission output shaft to the mechanical transmission assembly sun gear; while the other part of the power is transmitted through the seventh clutch $C_7$ to the mechanical transmission assembly ring gear, the two parts of the power are converged at the mechanical transmission assembly planet carrier, and the power after convergence is transmitted to the power-convergence assembly ring gear; the power transmitted to the power-convergence assembly sun gear and the power transmitted to the power-convergence assembly ring gear are converged at the power-convergence assembly planet carrier and then output from the output shaft.

Preferably, a rotation speed $n_o$ of the output shaft in the single transmission modes is calculated by the following methods:

in the hydraulic transmission mode:

$$n_o = \frac{e}{i_1 i_2} n_I$$

where $n_o$ is the rotation speed of the output shaft, $n_1$ is a rotation speed of the input shaft, e is a displacement ratio of the hydraulic transmission assembly, $i_1$ is a transmission ratio of the first gear pair, and $i_2$ is a transmission ratio of the second gear pair;

in the mechanical transmission mode:

$$n_o = \frac{k_2}{(1+k_2) i_5} n_I$$

where $n_o$ is the rotation speed of the output shaft, $n_1$ is the rotation speed of the input shaft, $i_5$ is a transmission ratio of the fifth gear pair, and $k_2$ is a planetary gear characteristic parameter of the mechanical transmission assembly;

in the electrical variable transmission mode:

$$n_o = \frac{1}{i_3 i_4 i_e} n_I$$

where $n_o$ is the rotation speed of the output shaft, $n_1$ is the rotation speed of the input shaft, $i_3$ is a transmission ratio of the third gear pair, $i_4$ is a transmission ratio of the fourth gear pair, and $i_e$ is a transmission ratio of the electrical variable transmission assembly.

Preferably, the rotation speed $n_o$ of the output shaft in the power-split composite transmission modes is calculated by the following methods:

in the hydraulic-mechanical split transmission mode:

$$n_o = \frac{k_1}{\frac{(1+k_2) i_5 (1+k_1)}{k_2} - \frac{i_1 i_2}{e}} n_I$$

where $n_o$ is the rotation speed of the output shaft, $n_1$ is the rotation speed of the input shaft, $k_1$ is a planetary gear characteristic parameter of the power-split assembly, $k_2$ is the planetary gear characteristic parameter of the mechanical transmission assembly, in is the transmission ratio of the first gear pair, $i_2$ is the transmission ratio of the second gear pair, $i_5$ is the transmission ratio of the fifth gear pair, and e is the displacement ratio of the hydraulic transmission assembly;

in the hydraulic-electrical split transmission mode:

$$n_o = \frac{k_1}{i_3 i_4 i_e (1+k_1) - \frac{i_1 i_2}{e}} n_I$$

where $n_o$ is the rotation speed of the output shaft, $n_1$ is the rotation speed of the input shaft, $k_1$ is the planetary gear characteristic parameter of the power-split assembly, in is the transmission ratio of the first gear pair, $i_2$ is the transmission ratio of the second gear pair, $i_3$ is the transmission ratio of the third gear pair, $i_5$ is the transmission ratio of the fourth gear pair, $i_e$ is the transmission ratio of the electrical variable transmission assembly, and e is the displacement ratio of the hydraulic transmission assembly;

in the hydraulic-mechanical-electrical split transmission mode:

$$n_o = \frac{k_1}{\frac{(1+k_2)(1+k_1)}{\frac{1}{i_3 i_4 i_e} + \frac{k_2}{i_5}} - \frac{i_1 i_2}{e}} n_I$$

where $n_o$ is the rotation speed of the output shaft, $n_1$ is the rotation speed of the input shaft, $k_1$ is the planetary gear characteristic parameter of the power-split assembly, $k_2$ is the planetary gear characteristic parameter of the mechanical transmission assembly, $i_1$ is the transmission ratio of the first gear pair, $i_2$ is the transmission ratio of the second gear pair, $i_5$ is the transmission ratio of the third gear pair, $i_4$ is the transmission ratio of the fourth gear pair, $i_5$ is the transmission ratio of the fifth gear pair, $i_e$ is the transmission ratio of the electrical variable transmission assembly, and e is the displacement ratio of the hydraulic transmission assembly.

Preferably, the rotation speed $n_o$ of the output shaft in the power-convergence composite transmission modes is calculated by the following methods:

in the mechanical-electrical convergence transmission mode:

$$n_o = \frac{\frac{1}{i_3 i_4 i_e} + \frac{k_2}{i_5}}{(1+k_2)} n_I$$

where $n_o$ is the rotation speed of the output shaft, $n_1$ is the rotation speed of the input shaft, $k_2$ is the planetary gear characteristic parameter of the mechanical transmission assembly, $i_3$ is the transmission ratio of the third gear pair, $i_4$ is the transmission ratio of the fourth gear pair, $i_5$ is the transmission ratio of the fifth gear pair, and $i_e$ is the transmission ratio of the electrical variable transmission assembly;

in the hydraulic-mechanical convergence transmission mode:

$$n_o = \frac{\frac{k_2 k_3}{(1+k_2) i_5} + \frac{e}{i_1 i_2}}{(1+k_3)} n_I$$

where $n_o$ is the rotation speed of the output shaft, $n_1$ is the rotation speed of the input shaft, $k_2$ is the planetary gear characteristic parameter of the mechanical transmission assembly, $k_3$ is the planetary gear characteristic parameter of the power-convergence assembly, in is the transmission ratio of the first gear pair, $i_2$ is the transmission ratio of the second gear pair, and e is the displacement ratio of the hydraulic transmission assembly;

in the hydraulic-electrical convergence transmission mode:

$$n_o = \frac{\frac{k_3}{i_3 i_4 i_e} + \frac{e}{i_1 i_2}}{(1+k_3)} n_I$$

where $n_o$ is the rotation speed of the output shaft, $n_1$ is the rotation speed of the input shaft, $k_3$ is the planetary gear characteristic parameter of the power-convergence assembly, $i_1$ is the transmission ratio of the first gear pair, $i_2$ is the transmission ratio of the second gear pair, $i_3$ is the transmission ratio of the third gear pair, $i_4$ is the transmission ratio of the fourth gear pair, $i_e$ is the transmission ratio of the electrical variable transmission assembly, and e is the displacement ratio of the hydraulic transmission assembly;

in the mechanical-hydraulic-electrical convergence transmission mode:

$$n_o = \frac{k_3 \frac{\frac{1}{i_3 i_4 i_e} + \frac{k_2}{i_5}}{(1+k_2)} + \frac{e}{i_1 i_2}}{(1+k_3)} n_I$$

where $n_o$ is the rotation speed of the output shaft, $n_1$ is the rotation speed of the input shaft, $k_2$ is the planetary gear characteristic parameter of the mechanical transmission assembly, $k_3$ is the planetary gear characteristic parameter of the power-convergence assembly, $i_1$ is the transmission ratio of the first gear pair, $i_2$ is the transmission ratio of the second gear pair, $i_3$ is the transmission ratio of the third gear pair, $i_5$ is the transmission ratio of the fourth gear pair, $i_5$ is the transmission ratio of the fifth gear pair, $i_e$ is the transmission ratio of the electrical variable transmission assembly, and e is the displacement ratio of the hydraulic transmission assembly.

Preferably, to realize switching between the hydraulic transmission mode and the electrical variable transmission mode, stepless speed regulation of switching between the multiple transmission modes is implemented by adjusting the displacement ratio of the hydraulic transmission assembly, adjusting the transmission ratio of the electrical variable transmission assembly, and controlling engagement of the clutches and the brake B.

Preferably, the stepless speed regulation of switching between the multiple transmission modes involves the following situations:

"hydraulic transmission mode"-"hydraulic-electrical convergence transmission mode"-"mechanical-hydraulic-electrical convergence transmission mode or hydraulic transmission mode"-"mechanical transmission mode"-"hydraulic-mechanical convergence transmission mode";

"hydraulic transmission mode"-"mechanical-electrical convergence transmission mode"-"electrical variable transmission mode"-"hydraulic-electrical split transmission mode"; "hydraulic transmission mode"-"hydraulic-mechanical-electrical split transmission mode"; "hydraulic transmission mode"-"hydraulic-mechanical split transmission mode".

According to the present disclosure, switching between multiple modes including hydraulic transmission, mechanical transmission, electrical variable transmission, mechanical-electrical convergence transmission, hydraulic-mechanical split transmission, hydraulic-electrical split transmission, hydraulic-mechanical-electrical split transmission, hydraulic-mechanical convergence transmission, hydraulic-electrical convergence transmission, and mechanical-hydraulic-electrical convergence transmission is implemented through engagement and disengagement of the clutch assembly and the brake assembly, so that the requirements of engineering machinery for a transmission device with multiple modes in different working conditions are satisfied, the engine power utilization is improved, and the fuel economy is increased. The shift impact is effectively reduced and the speed ratio adjustment range is expanded. The hydraulic transmission enables quick startup and stable operation and implements speed variation and direction change easily and rapidly without causing impact. The electrical variable transmission has a continuously changing transmission ratio and causes extremely small impact on the mechanism during operation. The mechanical-electrical-hydraulic composite transmission device of the present disclosure has multiple modes, so that the speed regulation range is effectively expanded, the requirement of nonlinear stepless speed regulation within a large range is satisfied, and the hydraulic-electrical composite transmission modes and the mechanical-hydraulic-electrical composite transmission modes improve the system transmission efficiency and meet the requirement of regional high-efficiency stepless speed regulation.

BRIEF DESCRIPTION OF THE DRAWINGS

To illustrate the technical solutions in the embodiments of the present disclosure or in the prior art more clearly, the accompanying drawings required for the description of the embodiments or the prior art are introduced briefly in the following. Apparently, the accompanying drawings in the following description show merely the embodiments of the present disclosure, and persons of ordinary skill in the art can derive other drawings from the accompanying drawings without creative efforts.

DETAILED DESCRIPTION OF THE EMBODIMENTS

The technical solutions of the present disclosure will be clearly and completely described below with reference to the accompanying drawings in the embodiments of the present disclosure. It is obvious that the embodiments to be described are only a part rather than all of the embodiments of the present disclosure. All other embodiments derived by persons of ordinary skill in the art based on the embodiments of the present disclosure without creative efforts shall fall within the protection scope of the present disclosure.

In the description of the present disclosure, it should be understood that terms such as "upper", "lower", "front", "back", "left", "right", "vertical", "horizontal", "top", "bottom", "inner", and "outer" indicate directional or positional relationships based on the accompanying drawings. They are merely used for the convenience and simplicity of the description of the present disclosure, instead of indicating or implying that the demonstrated device or element is located in a specific direction or is constructed and operated in a specific direction. Therefore, they cannot be construed as limitations to the present disclosure.

In the present disclosure, unless otherwise expressly specified and defined, a first feature "on" or "under" a second feature may denote that the first and second features are in direct contact or the first and second features are not in direct contact but through another feature between them. Moreover, the first feature "on", "over", or "above" the second feature denotes that the first feature is directly above or obliquely above the second feature or it simply means that the first feature is at a higher level than the second feature. The first feature "under", "beneath", or "below" the second feature denotes that the first feature is directly below or obliquely below the second feature or it simply means that the first feature is at a lower level than the second feature.

Figure 1:
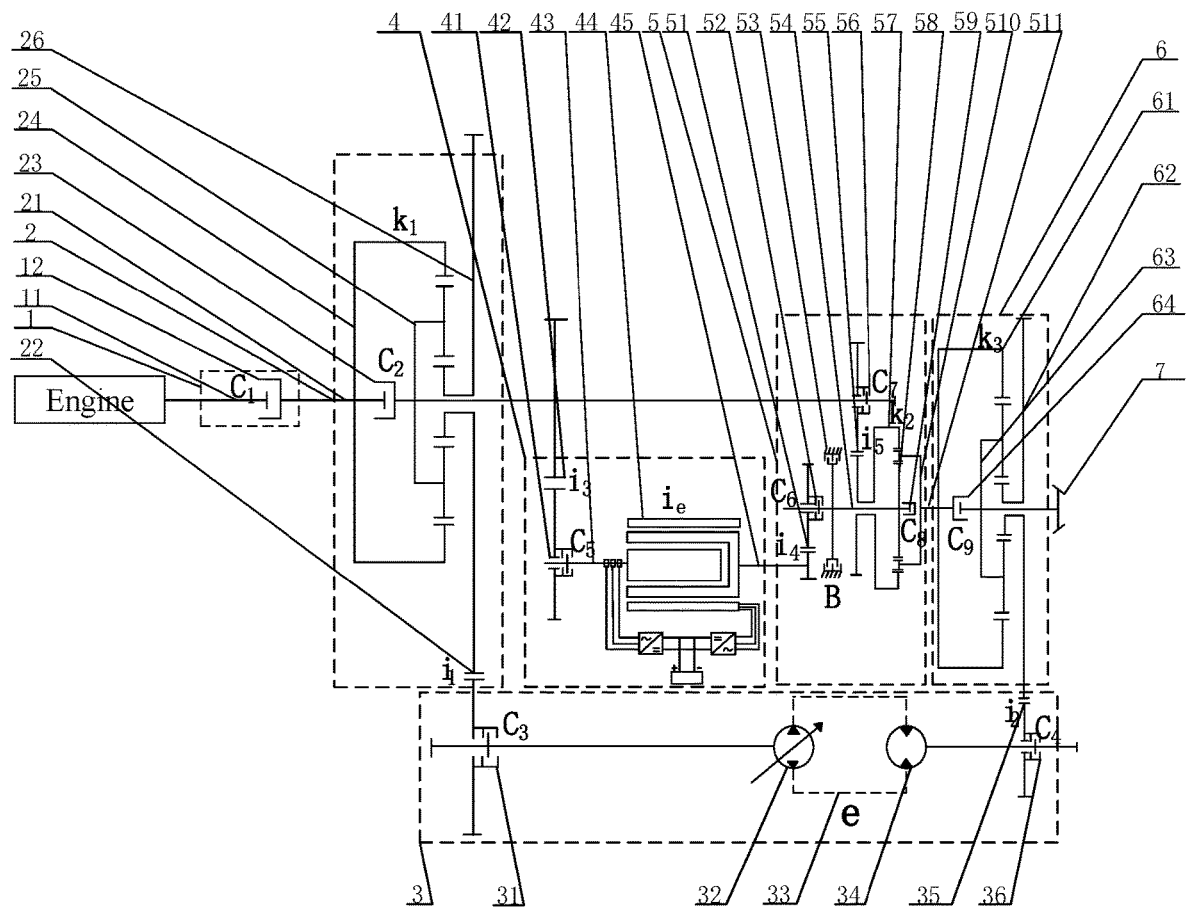
FIG. 1 is a schematic structural diagram of the present disclosure.

As shown in FIG. 1, a mechanical-electrical-hydraulic composite transmission device is provided, which includes:
  an input shaft assembly 1 including an input shaft 11 and a first clutch $C_1$ 12;
  a power-split assembly 2 including a power-split assembly input shaft 21, a first gear pair 22, a second clutch $C_2$ 23, a power-split assembly ring gear 24, a power-split assembly planet carrier 25, and a power-split assembly sun gear 26, where the power-split assembly ring gear 24 is connected to the power-split assembly input shaft 21, the power-split assembly input shaft 21 is connected to the input shaft 11 through the first clutch $C_1$ 12, and the power-split assembly ring gear 24 is connected to the power-split assembly planet carrier 25 through the second clutch $C_2$ 23;
  a hydraulic transmission assembly 3 including a third clutch $C_3$ 31, a variable displacement pump 32, a hydraulic pipe 33, a fixed displacement motor 34, a second gear pair 35, and a fourth clutch $C_4$ 36, where an input end of the hydraulic transmission assembly 3 is connected to the power-split assembly sun gear 26, the input end of the hydraulic transmission assembly 3 is connected to the variable displacement pump 32 through the third clutch $C_3$ 31, the variable displacement pump 32 outputs high-pressure oil to the fixed displacement motor 34 through the hydraulic pipe 33, and the second gear pair 35 is connected to an output shaft of the fixed displacement motor 34 through the fourth clutch $C_4$ 36;

an electrical variable transmission assembly 4 including a fifth clutch $C_5$ 41, a third gear pair 42, an electrical variable transmission input shaft 43, an electrical variable transmission 44, and an electrical variable transmission output shaft 45, where the power-split assembly planet carrier 25 is connected to the electrical variable transmission input shaft 43 through the fifth clutch $C_5$ 41;

a mechanical transmission assembly 5 including a fourth gear pair 51, a sixth clutch $C_6$ 52, a brake B 53, a mechanical transmission assembly input shaft 54, a fifth gear pair 55, a seventh clutch $C_7$ 56, a mechanical transmission assembly ring gear 57, a mechanical transmission assembly sun gear 58, an eighth clutch $C_8$ 59, a mechanical transmission assembly planet carrier 510, and a mechanical transmission assembly output shaft 511, where the electrical variable transmission output shaft 45 is connected to the mechanical transmission assembly sun gear 58 through the sixth clutch $C_6$ 52, the brake B 53 is connected to the mechanical transmission assembly sun gear 58, the power-split assembly planet carrier 25 is connected to the mechanical transmission assembly ring gear 57 through the seventh clutch $C_7$ 56, and the mechanical transmission assembly sun gear 58 is connected to the mechanical transmission assembly planet carrier 510 through the eighth clutch $C_8$ 59;

a power-convergence assembly 6 including a power-convergence assembly ring gear 61, a power-convergence assembly sun gear 62, a power-convergence assembly planet carrier 63, and a ninth clutch $C_9$ 64, where the power-convergence assembly ring gear 61 is fixedly connected to the mechanical transmission assembly output shaft 511, the power-convergence assembly ring gear 61 is connected to the power-convergence assembly planet carrier 63 through the ninth clutch $C_9$ 64, and the power-convergence assembly sun gear 62 is connected to an output end of the hydraulic transmission assembly 3;

an output shaft 7, where the output shaft 7 is connected to the power-convergence assembly planet carrier 63.

According to the present disclosure, switching between multiple modes including hydraulic transmission, mechanical transmission, electrical variable transmission, mechanical-electrical convergence transmission, hydraulic-mechanical split transmission, hydraulic-electrical split transmission, hydraulic-mechanical-electrical split transmission, hydraulic-mechanical convergence transmission, hydraulic-electrical convergence transmission, and mechanical-hydraulic-electrical convergence transmission is implemented through engagement and disengagement of the clutch assembly and the brake assembly, so that the requirements of engineering machinery for a transmission device with multiple modes in different working conditions are satisfied, the engine power utilization is improved, and the fuel economy is increased. The shift impact is effectively reduced and the speed ratio adjustment range is expanded. The hydraulic transmission enables quick startup and stable operation and implements speed variation and direction change easily and rapidly without causing impact. The electrical variable transmission has a continuously changing transmission ratio and causes extremely small impact on the mechanism during operation. The speed regulation range is effectively expanded and the requirement of nonlinear stepless speed regulation within a large range is satisfied. The hydraulic-electrical composite transmission modes and the mechanical-hydraulic-electrical composite transmission modes improve the system transmission efficiency and meet the requirement of regional high-efficiency stepless speed regulation.

A control method of the mechanical-electrical-hydraulic composite transmission device is provided to implement three types of transmission modes including single transmission modes, power-split composite transmission modes, and power-convergence composite transmission modes by controlling engagement and disengagement of the clutches and the brake B 53. The single transmission modes include a hydraulic transmission mode, a mechanical transmission mode, and an electrical variable transmission mode. The power-split composite transmission modes include a hydraulic-mechanical split transmission mode, a hydraulic-electrical split transmission mode, and a hydraulic-mechanical-electrical split transmission mode. The power-convergence composite transmission modes include a mechanical-electrical convergence transmission mode, a hydraulic-mechanical convergence transmission mode, a hydraulic-electrical convergence transmission mode, and a mechanical-hydraulic-electrical convergence transmission mode.

The engaged components in each transmission mode are shown in Table 1. The details are as follows:

TABLE 1

Engagement state of mode-switching components

| Type | Mode | $C_1$ | $C_2$ | $C_3$ | $C_4$ | $C_5$ | $C_6$ | $C_7$ | $C_8$ | $C_9$ | B | Input-output speed relationship |
|---|---|---|---|---|---|---|---|---|---|---|---|---|
| Single transmission modes | Hydraulic transmission | 1 | 1 | 1 | 1 | | | | | 1 | | $n_o = \dfrac{e}{i_1 i_2} n_I$ |
| | Mechanical transmission | 1 | 1 | | | | | 1 | | 1 | 1 | $n_o = \dfrac{k_2}{(1+k_2)i_5} n_I$ |
| | Electrical variable transmission | 1 | 1 | | | 1 | 1 | | 1 | 1 | | $n_o = \dfrac{1}{i_3 i_4 i_e} n_I$ |

TABLE 1-continued

Engagement state of mode-switching components

| Type | Mode | $C_1$ | $C_2$ | $C_3$ | $C_4$ | $C_5$ | $C_6$ | $C_7$ | $C_8$ | $C_9$ | B | Input-output speed relationship |
|---|---|---|---|---|---|---|---|---|---|---|---|---|
| Power-split transmission | Hydraulic-mechanical split transmission | 1 |  | 1 | 1 |  |  | 1 |  | 1 | 1 | $n_o = \dfrac{k_1}{\dfrac{(1+k_2)i_5(1+k_1)}{k_2} - \dfrac{i_1 i_2}{e}} n_I$ |
|  | Hydraulic-electrical split transmission | 1 |  | 1 | 1 | 1 | 1 |  | 1 | 1 |  | $n_o = \dfrac{k_1}{i_3 i_4 i_e(1+k_1) - \dfrac{i_1 i_2}{e}} n_I$ |
|  | Hydraulic-mechanical-electrical split transmission | 1 |  | 1 | 1 | 1 | 1 | 1 |  | 1 |  | $n_o = \dfrac{k_1}{\dfrac{(1+k_2)(1+k_1)}{\dfrac{1}{i_3 i_4 i_e} + \dfrac{k_2}{i_5}} - \dfrac{i_1 i_2}{e}} n_I$ |
| Power-convergence transmission | Mechanical-electrical convergence transmission | 1 | 1 |  | 1 | 1 | 1 |  | 1 |  |  | $n_o = \dfrac{\dfrac{1}{i_3 i_4 i_e} + \dfrac{k_2}{i_5}}{(1+k_2)} n_I$ |
|  | Hydraulic-mechanical convergence transmission mode | 1 | 1 | 1 | 1 |  |  | 1 |  |  | 1 | $n_o = \dfrac{\dfrac{k_2 k_3}{(1+k_2)i_5} + \dfrac{e}{i_1 i_2}}{(1+k_3)} n_I$ |
|  | Hydraulic-electrical convergence transmission | 1 | 1 | 1 | 1 | 1 | 1 |  | 1 |  |  | $n_o = \dfrac{\dfrac{k_3}{i_3 i_4 i_e} + \dfrac{e}{i_1 i_2}}{(1+k_3)} n_I$ |
|  | Mechanical-hydraulic-electrical convergence transmission | 1 | 1 | 1 | 1 | 1 | 1 | 1 |  |  |  | $n_o = \dfrac{\dfrac{\dfrac{1}{i_3 i_4 i_e} + \dfrac{k_2}{i_5}}{(1+k_2)} + \dfrac{e}{i_1 i_2}}{(1+k_3)} n_I$ |

Figure 2:
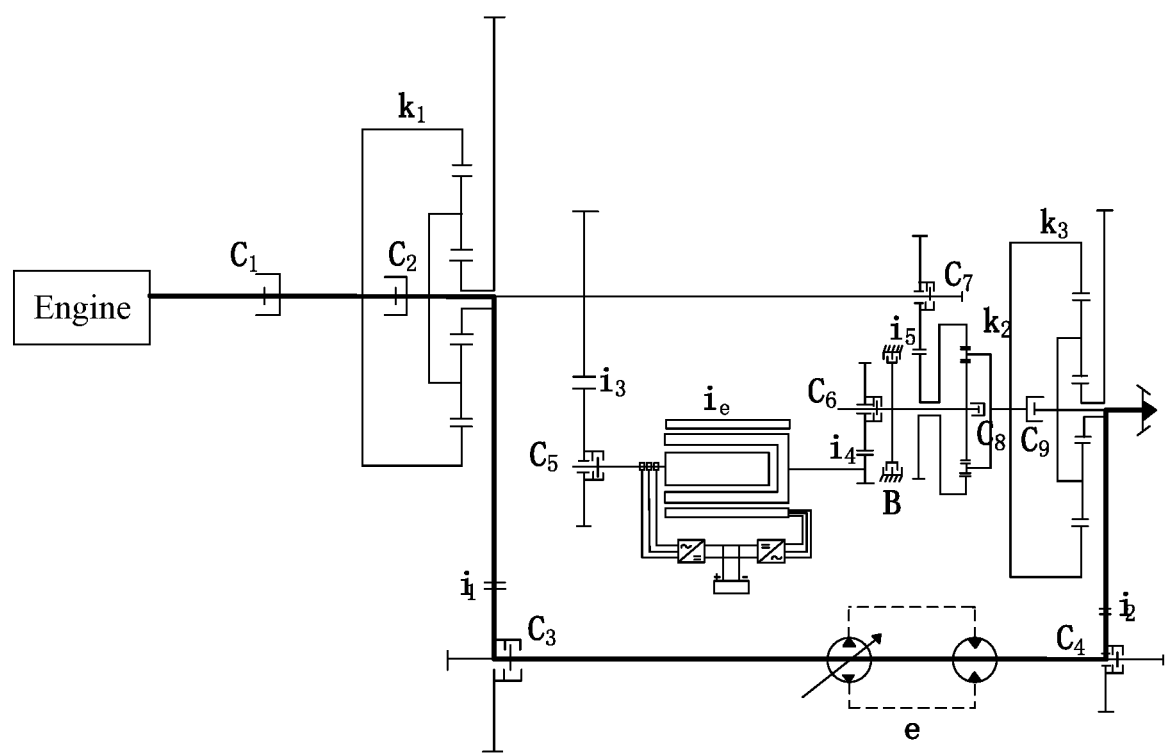
FIG. 2 is a schematic diagram showing the power flow in a hydraulic transmission mode according to the present disclosure.

As shown in FIG. 2, the hydraulic transmission mode is controlled by the following method. The first clutch $C_1$ 12, the second clutch $C_2$ 23, the third clutch $C_3$ 31, the fourth clutch $C_4$ 36, and the ninth clutch $C_9$ 64 are engaged while the fifth clutch $C_5$ 41, the sixth clutch $C_6$ 52, the seventh clutch $C_7$ 56, the eighth clutch $C_8$ 59, and the brake B 53 are disengaged. Power is input from the input shaft 11 and then passes through the first gear pair 22 to drive the variable displacement pump 32 to work. The variable displacement pump 32 outputs high-pressure oil to drive the fixed displacement motor 34 to rotate. The power output from the output end of the fixed displacement motor 34 is transmitted through the second gear pair 35 and then output from the output shaft 7.

The rotation speed of the output shaft 7 in the hydraulic transmission mode is calculated by the following method:

$$n_o = \frac{e}{i_1 i_2} n_I$$

where $n_o$ is the rotation speed of the output shaft 7, $n_1$ is the rotation speed of the input shaft 11, e is the displacement ratio of the hydraulic transmission assembly 3, $i_1$ is the transmission ratio of the first gear pair 22, and $i_2$ is the transmission ratio of the second gear pair 35.

Figure 3:
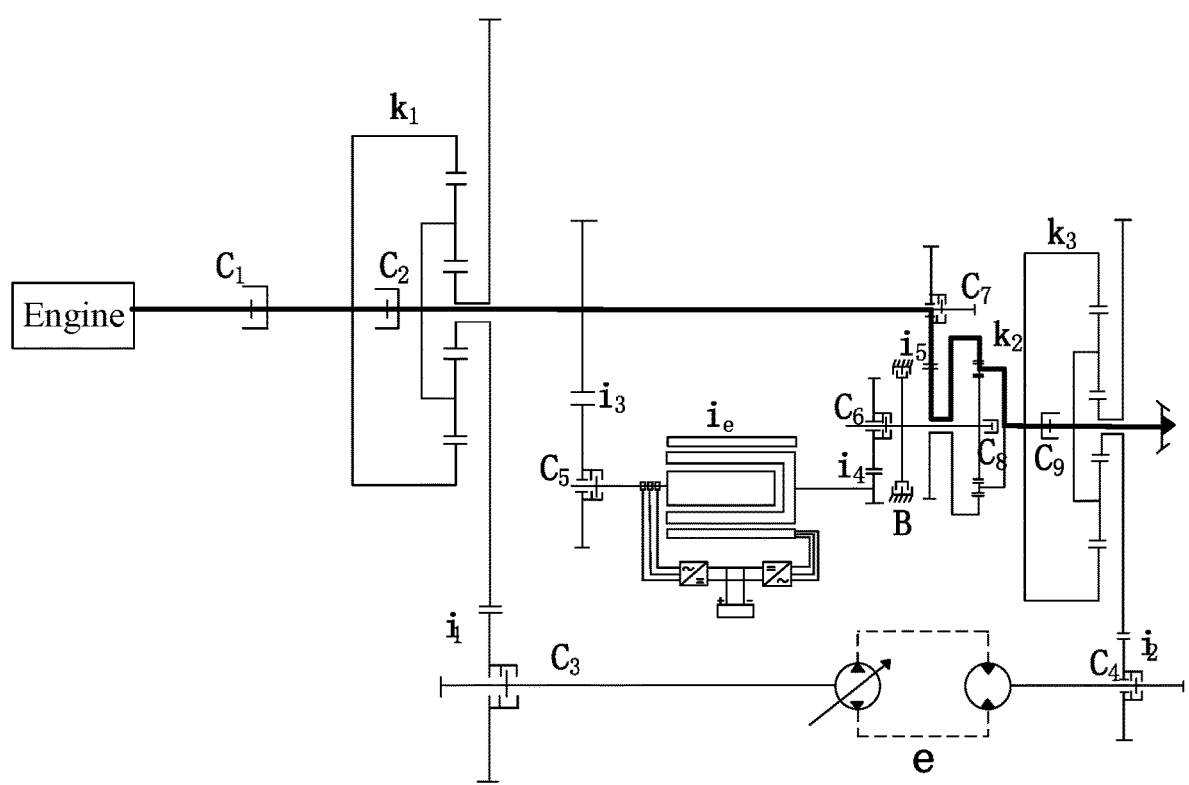
FIG. 3 is a schematic diagram showing the power flow in a mechanical transmission mode according to the present disclosure.

As shown in FIG. 3, the mechanical transmission mode is controlled by the following method.

The first clutch $C_1$ 12, the second clutch $C_2$ 23, the seventh clutch $C_7$ 56, the ninth clutch $C_9$ 64, and the brake B 53 are engaged while the third clutch $C_3$ 31, the fourth clutch $C_4$ 36, the fifth clutch $C_5$ 41, the sixth clutch $C_6$ 52, and the eighth clutch $C_8$ 59 are disengaged. Power is input from the input shaft 11 and then sequentially passes through the first clutch $C_1$ 12, the second clutch $C_2$ 23, and the seventh clutch $C_7$ 56 to drive the mechanical transmission assembly ring gear 57 to work. The power output from the mechanical transmission assembly ring gear 57 is transmitted through the mechanical transmission assembly planet carrier 510 and then output from the output shaft 7.

The rotation speed of the output shaft 7 in the mechanical transmission mode is calculated by the following method:

$$n_o = \frac{k_2}{(1+k_2)i_5}n_I$$

where $n_o$ is the rotation speed of the output shaft 7, $n_1$ is the rotation speed of the input shaft 11, $i_5$ is the transmission ratio of the fifth gear pair 55, and $k_2$ is the planetary gear characteristic parameter of the mechanical transmission assembly 5.

Figure 4:
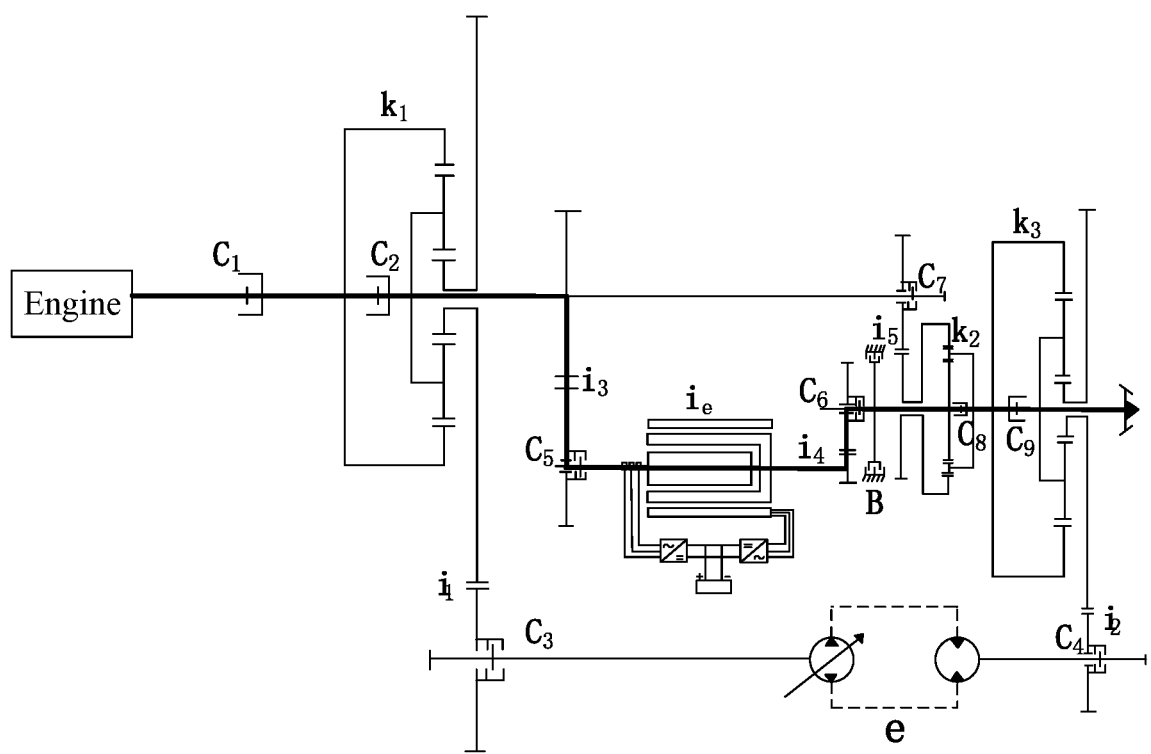
FIG. 4 is a schematic diagram showing the power flow in an electrical variable transmission mode according to the present disclosure.

As shown in FIG. 4, the electrical variable transmission mode is controlled by the following method.

The first clutch $C_1$ 12, the second clutch $C_2$ 23, the fifth clutch $C_5$ 41, the sixth clutch $C_6$ 52, the eighth clutch $C_8$ 59, and the ninth clutch $C_9$ 64 are engaged while the third clutch $C_3$ 31, the fourth clutch $C_4$ 36, the seventh clutch $C_7$ 56, and the brake B 53 are disengaged. The power-split assembly 2 and the power-convergence assembly 6 are each fixedly connected as a whole. Power is input from the input shaft 11, then transmitted through the power-split assembly 2, the electrical variable transmission assembly 4, and the power-convergence assembly 6, and output from the output shaft 7.

The rotation speed of the output shaft 7 in the electrical variable transmission mode is calculated by the following method:

$$n_o = \frac{1}{i_3 i_4 i_e}n_I$$

where $n_o$ is the rotation speed of the output shaft 7, $n_1$ is the rotation speed of the input shaft 11, $i_5$ is the transmission ratio of the third gear pair 42, $i_4$ is the transmission ratio of the fourth gear pair 51, and $i_e$ is the transmission ratio of the electrical variable transmission assembly 4.

Figure 5:
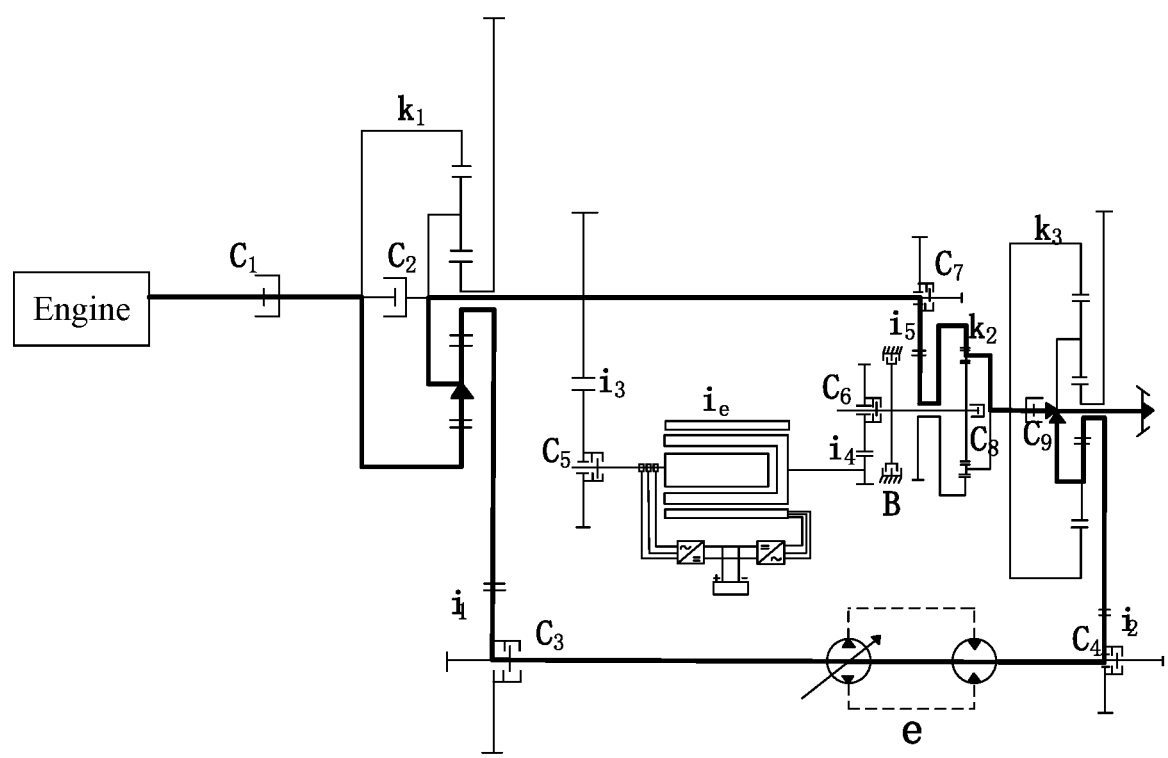
FIG. 5 is a schematic diagram showing the power flow in a hydraulic-mechanical split transmission mode according to the present disclosure.

As shown in FIG. 5, the hydraulic-mechanical split transmission mode is controlled by the following method.

The first clutch $C_1$ 12, the third clutch $C_3$ 31, the fourth clutch $C_4$ 36, the seventh clutch $C_7$ 56, the ninth clutch $C_9$ 64, and the brake B 53 are engaged while the second clutch $C_2$ 23, the fifth clutch $C_5$ 41, the sixth clutch $C_6$ 52, and the eighth clutch $C_8$ 59 are disengaged. Power is input from the input shaft 11, then passes through the power-split assembly input shaft 21 to the power-split assembly ring gear 24, and is split into two parts. One part of the power is transmitted through the power-split assembly sun gear 26 and the hydraulic transmission assembly 3 to the power-convergence assembly sun gear 62. The other part of the power is transmitted through the power-split assembly planet carrier 25, the mechanical transmission assembly ring gear 57, and the mechanical transmission assembly planet carrier 510 to the power-convergence assembly ring gear 61. Since the power-convergence assembly 6 is fixedly connected as a whole, the power transmitted to the power-convergence assembly sun gear 62 and the power transmitted to the power-convergence assembly ring gear 61 pass through the power-convergence assembly 6 and are output from the output shaft 7.

The rotation speed of the output shaft 7 in the hydraulic-mechanical split transmission mode is calculated by the following method:

$$n_o = \frac{k_1}{\frac{(1+k_2)i_5(1+k_1)}{k_2} - \frac{i_1 i_2}{e}}n_I$$

where $n_o$ is the rotation speed of the output shaft 7, $n_1$ is the rotation speed of the input shaft 11, $k_1$ is the planetary gear characteristic parameter of the power-split assembly 2, $k_2$ is the planetary gear characteristic parameter of the mechanical transmission assembly 5, $i_1$ is the transmission ratio of the first gear pair 22, $i_2$ is the transmission ratio of the second gear pair 35, $i_5$ is the transmission ratio of the fifth gear pair 55, and e is the displacement ratio of the hydraulic transmission assembly 3.

Figure 6:
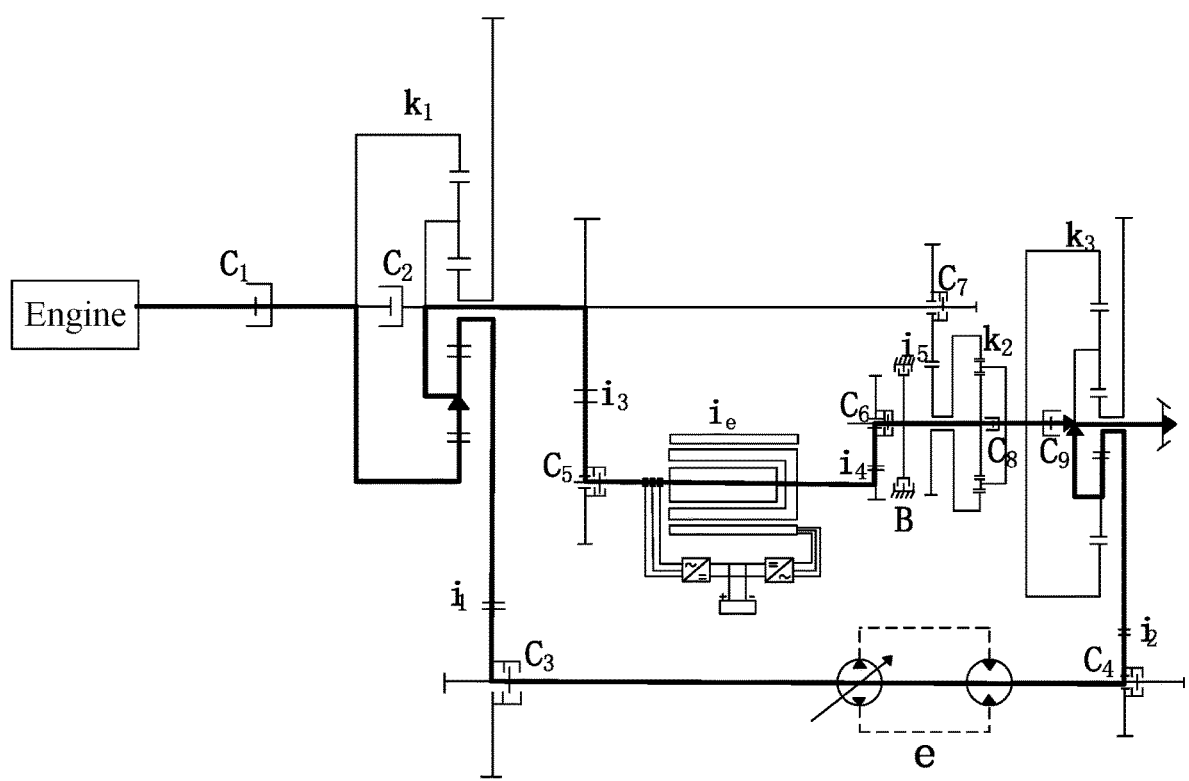
FIG. 6 is a schematic diagram showing the power flow in a hydraulic-electrical split transmission mode according to the present disclosure.

As shown in FIG. 6, the hydraulic-electrical split transmission mode is controlled by the following method.

The first clutch $C_1$ 12, the third clutch $C_3$ 31, the fourth clutch $C_4$ 36, the fifth clutch $C_5$ 41, the sixth clutch $C_6$ 52, the eighth clutch $C_8$ 59, and the ninth clutch $C_9$ 64 are engaged while the second clutch $C_2$ 23, the seventh clutch $C_7$ 56, and the brake B 53 are disengaged. Power is input from the input shaft 11, then passes through the power-split assembly input shaft 21 to the power-split assembly ring gear 24, and is split into two parts. One part of the power is transmitted through the power-split assembly sun gear 26 and the hydraulic transmission assembly 3 to the power-convergence assembly sun gear 62. The other part of the power is transmitted through the power-split assembly planet carrier 25 to the electrical variable transmission input shaft 43, the electrical variable transmission input shaft 43 drives the electrical variable transmission 44 to work, and the power output by the electrical variable transmission 44 is transmitted through the electrical variable transmission output shaft 45 to the power-convergence assembly ring gear 61. Since the power-convergence assembly 6 is fixedly connected as a whole, the power transmitted to the power-convergence assembly sun gear 62 and the power transmitted to the power-convergence assembly ring gear 61 pass through the power-convergence assembly 6 and are output from the output shaft 7.

The rotation speed of the output shaft 7 in the hydraulic-electrical split transmission mode is calculated by the following method:

$$n_o = \frac{k_1}{i_3 i_4 i_e (1+k_1) - \frac{i_1 i_2}{e}}n_I$$

where $n_o$ is the rotation speed of the output shaft 7, $n_1$ is the rotation speed of the input shaft 11, $k_1$ is the planetary gear characteristic parameter of the power-split assembly 2, $i_1$ is the transmission ratio of the first gear pair 22, $i_2$ is the transmission ratio of the second gear pair 35, $i_5$ is the transmission ratio of the third gear pair 42, $i_4$ is the transmission ratio of the fourth gear pair 51, $i_e$ is the transmission ratio of the electrical variable transmission assembly 4, and e is the displacement ratio of the hydraulic transmission assembly 3.

Figure 7:
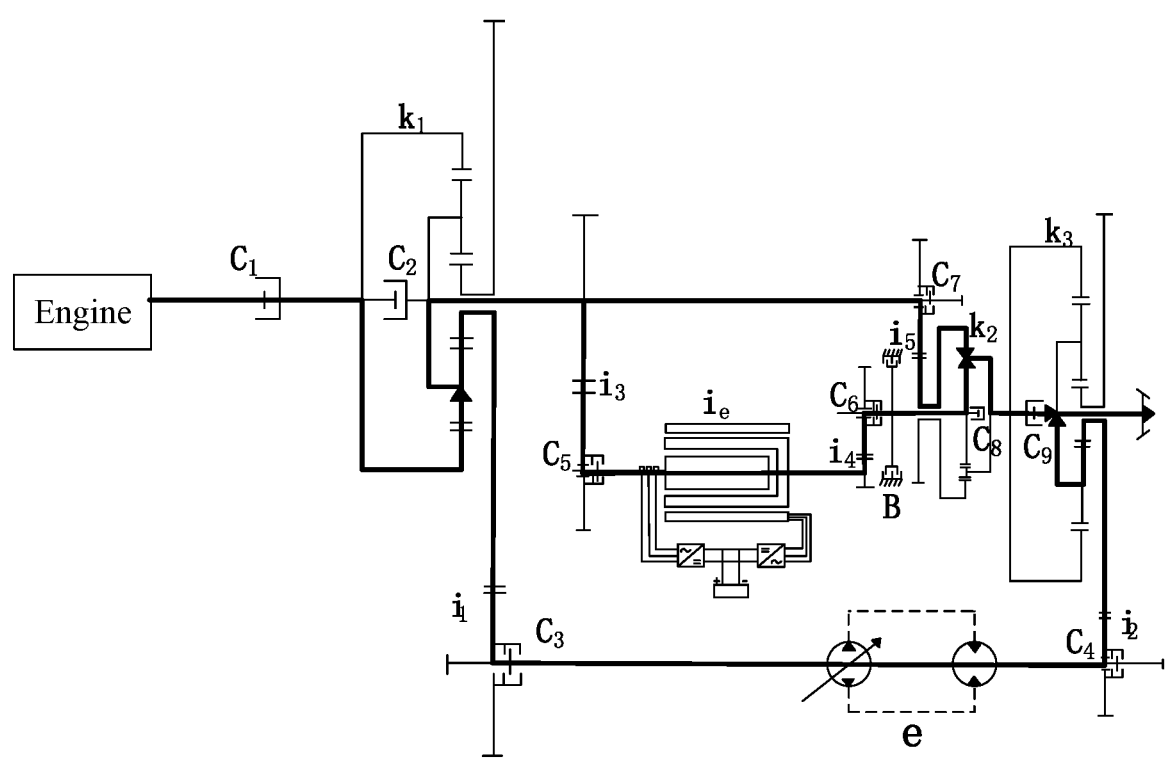
FIG. 7 is a schematic diagram showing the power flow in a hydraulic-mechanical-electrical split transmission mode according to the present disclosure.

As shown in FIG. 7, the hydraulic-mechanical-electrical split transmission mode is controlled by the following method.

In the hydraulic-mechanical-electrical split transmission mode, the first clutch $C_1$ 12, the third clutch $C_3$ 31, the fourth clutch $C_4$ 36, the fifth clutch $C_5$ 41, the sixth clutch $C_6$ 52, the seventh clutch $C_7$ 56, and the ninth clutch $C_9$ 64 are engaged while the second clutch $C_2$ 23, the eighth clutch $C_8$ 59, and the brake B 53 are disengaged. Power is input from the input shaft 11, then passes through the power-split assembly input shaft 21 to the power-split assembly ring gear 24, and is split into two parts. One part of the power is transmitted through the power-split assembly sun gear 26 and the hydraulic transmission assembly 3 to the power-convergence assembly sun gear 62. The other part of the power passes through the power-split assembly planet carrier 25 and is split again, where one part of the power is transmitted through the fifth clutch $C_5$ 41 to the electrical variable transmission input shaft 43, the electrical variable transmission input shaft 43 drives the electrical variable transmission 44 to work, and the power output by the electrical variable transmission 44 is transmitted through the electrical variable transmission output shaft 45 to the mechanical transmission assembly sun gear 58; while the other part of the power is transmitted through the seventh clutch $C_7$ 56 to the mechanical transmission assembly ring gear 57, the two parts of the power are converged at the mechanical transmission assembly planet carrier 510, and the power after convergence is transmitted to the power-convergence assembly ring gear 61. Since the power-convergence assembly 6 is fixedly connected as a whole, the power transmitted to the power-convergence assembly sun gear 62 and the power transmitted to the power-convergence assembly ring gear 61 pass through the power-convergence assembly 6 and are output from the output shaft 7.

The rotation speed of the output shaft 7 in the hydraulic-mechanical-electrical split transmission mode is calculated by the following method:

$$n_o = \frac{k_1}{(1+k_2)(1+k_1)} \cdot \frac{1}{\frac{1}{i_3 i_4 i_e} + \frac{k_2}{i_5} - \frac{i_1 i_2}{e}} n_I$$

where $n_o$ is the rotation speed of the output shaft 7, $n_1$ is the rotation speed of the input shaft 11, $k_1$ is the planetary gear characteristic parameter of the power-split assembly 2, $k_2$ is the planetary gear characteristic parameter of the mechanical transmission assembly 5, $i_1$ is the transmission ratio of the first gear pair 22, $i_2$ is the transmission ratio of the second gear pair 35, $i_5$ is the transmission ratio of the third gear pair 42, $i_4$ is the transmission ratio of the fourth gear pair 51, $i_5$ is the transmission ratio of the fifth gear pair 55, $i_e$ is the transmission ratio of the electrical variable transmission assembly 4, and e is the displacement ratio of the hydraulic transmission assembly 3.

Figure 8:
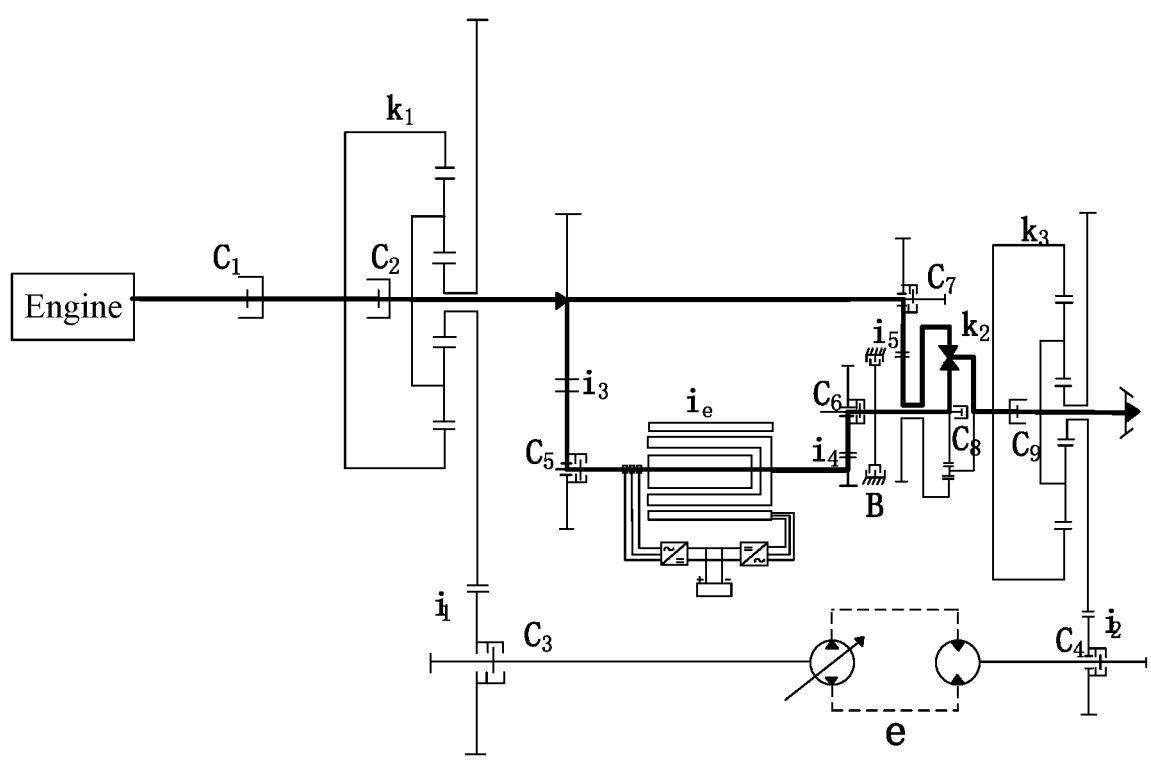
FIG. 8 is a schematic diagram showing the power flow in a mechanical-electrical convergence transmission mode according to the present disclosure.

As shown in FIG. 8, the mechanical-electrical convergence transmission mode is controlled by the following method.

In the mechanical-electrical convergence transmission mode, the first clutch $C_1$ 12, the second clutch $C_2$ 23, the fifth clutch $C_5$ 41, the sixth clutch $C_6$ 52, the seventh clutch $C_7$ 56, and the ninth clutch $C_9$ 64 are engaged while the third clutch $C_3$ 31, the fourth clutch $C_4$ 36, the eighth clutch $C_8$ 59, and the brake B 53 are disengaged. The power-split assembly 2 and the power-convergence assembly 6 are each fixedly connected as a whole. Power is input from the input shaft 11, then passes through the power-split assembly 2, and is split into two parts. One part of the power is transmitted through the fifth clutch $C_5$ 41 to the electrical variable transmission input shaft 43, the electrical variable transmission input shaft 43 drives the electrical variable transmission 44 to work, and the power output by the electrical variable transmission 44 is transmitted through the electrical variable transmission output shaft 45 to the mechanical transmission assembly sun gear 58. The other part of the power is transmitted through the seventh clutch $C_7$ 56 to the mechanical transmission assembly ring gear 57. The two parts of the power are converged at the mechanical transmission assembly planet carrier 510. The power after convergence is transmitted through the power-convergence assembly 6 and then output from the output shaft 7.

The rotation speed of the output shaft 7 in the mechanical-electrical convergence transmission mode is calculated by the following method:

$$n_o = \frac{\frac{1}{i_3 i_4 i_e} + \frac{k_2}{i_5}}{(1+k_2)} n_I$$

where $n_o$ is the rotation speed of the output shaft 7, $n_1$ is the rotation speed of the input shaft 11, $k_2$ is the planetary gear characteristic parameter of the mechanical transmission assembly 5, $i_3$ is the transmission ratio of the third gear pair 42, $i_4$ is the transmission ratio of the fourth gear pair 51, $i_5$ is the transmission ratio of the fifth gear pair 55, and $i_e$ is the transmission ratio of the electrical variable transmission assembly 4.

Figure 9:
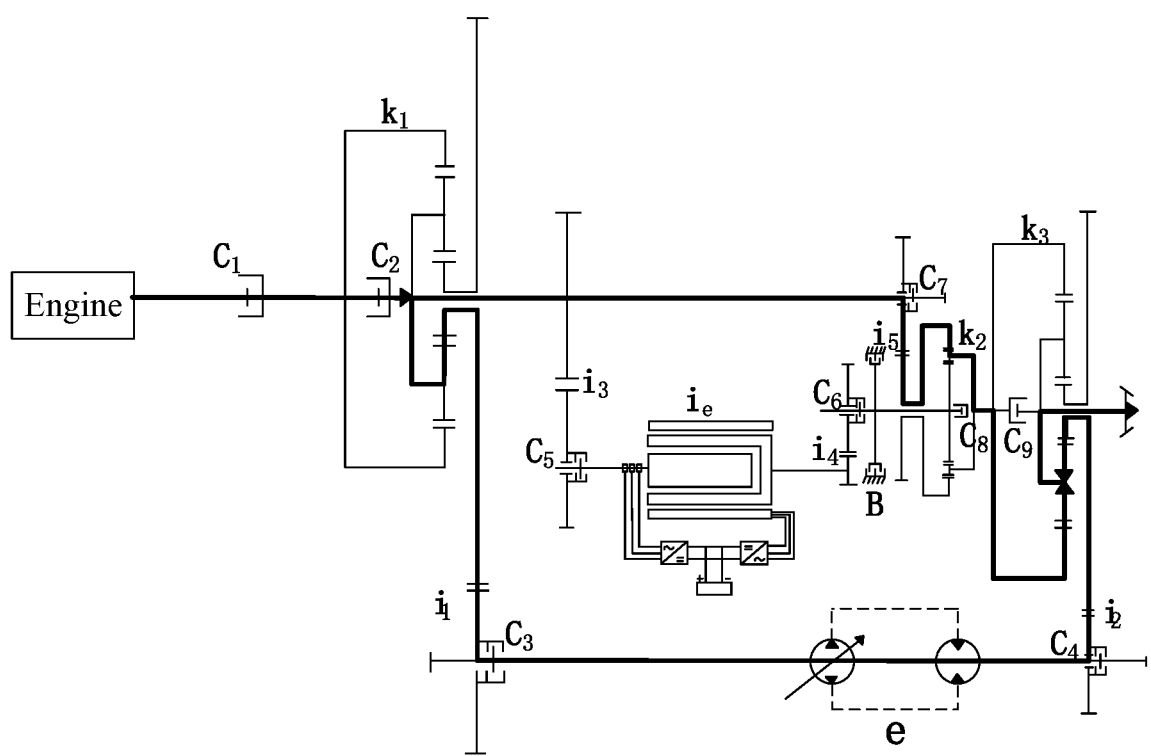
FIG. 9 is a schematic diagram showing the power flow in a hydraulic-mechanical convergence transmission mode according to the present disclosure.

As shown in FIG. 9, the hydraulic-mechanical convergence transmission mode is controlled by the following method.

The first clutch $C_1$ 12, the second clutch $C_2$ 23, the third clutch $C_3$ 31, the fourth clutch $C_4$ 36, the seventh clutch $C_7$ 56, and the brake B 53 are engaged while the fifth clutch $C_5$ 41, the sixth clutch $C_6$ 52, and the ninth clutch $C_9$ 64 are disengaged. The power-split assembly 2 is fixedly connected as a whole. Power is input from the input shaft 11, then passes through the power-split assembly 2, and is split into two parts. One part of the power is transmitted through the hydraulic transmission assembly 3 to the power-convergence assembly sun gear 62. The other part of the power is transmitted through the power-split assembly planet carrier 25, the mechanical transmission assembly ring gear 57, and the mechanical transmission assembly planet carrier 510 to the power-convergence assembly ring gear 61. The power transmitted to the power-convergence assembly sun gear 62 and the power transmitted to the power-convergence assembly ring gear 61 are converged at the power-convergence assembly planet carrier 63 and then output from the output shaft 7.

The rotation speed of the output shaft 7 in the hydraulic-mechanical convergence transmission mode is calculated by the following method:

$$n_o = \frac{\frac{k_2 k_3}{(1+k_2)i_5} + \frac{e}{i_1 i_2}}{(1+k_3)} n_I$$

where $n_o$ is the rotation speed of the output shaft 7, $n_1$ is the rotation speed of the input shaft 11, $k_2$ is the planetary gear characteristic parameter of the mechanical transmission assembly 5, $k_3$ is the planetary gear characteristic parameter of the power-convergence assembly 6, $i_1$ is the transmission ratio of the first gear pair 22, $i_2$ is the transmission ratio of the second gear pair 35, and e is the displacement ratio of the hydraulic transmission assembly 3.

Figure 10:
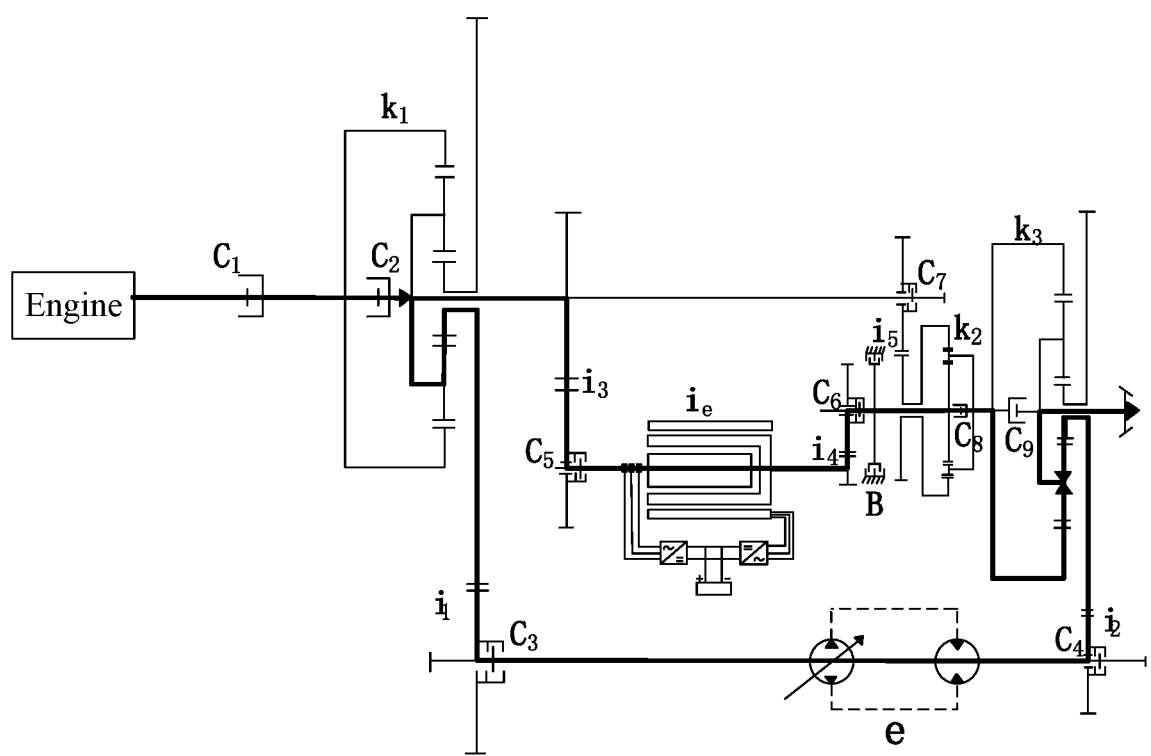
FIG. 10 is a schematic diagram showing the power flow in a hydraulic-electrical convergence transmission mode according to the present disclosure.

As shown in FIG. 10, the hydraulic-electrical convergence transmission mode is controlled by the following method.

In the hydraulic-electrical convergence transmission mode, the first clutch $C_1$ 12, the second clutch $C_2$ 23, the third clutch $C_3$ 31, the fourth clutch $C_4$ 36, the fifth clutch $C_5$ 41, the sixth clutch $C_6$ 52, and the eighth clutch $C_8$ 59 are engaged while the seventh clutch $C_7$ 56, the ninth clutch $C_9$ 64, and the brake B 53 are disengaged. The power-split assembly 2 is fixedly connected as a whole. Power is input from the input shaft 11, then passes through the power-split assembly 2, and is split into two parts. One part of the power is transmitted through the hydraulic transmission assembly 3 to the power-convergence assembly sun gear 62. The other part of the power is transmitted through the power-split assembly planet carrier 25 to the electrical variable transmission input shaft 43, the electrical variable transmission input shaft 43 drives the electrical variable transmission 44 to work, and the power output by the electrical variable transmission 44 is transmitted through the electrical variable transmission output shaft 45 to the power-convergence assembly ring gear 61. The power transmitted to the power-convergence assembly sun gear 62 and the power transmitted to the power-convergence assembly ring gear 61 are converged at the power-convergence assembly planet carrier 63 and then output from the output shaft 7.

The rotation speed of the output shaft 7 in the hydraulic-electrical convergence transmission mode is calculated by the following method:

$$n_o = \frac{\frac{k_3}{i_3 i_4 i_e} + \frac{e}{i_1 i_2}}{(1+k_3)} n_I$$

where $n_o$ is the rotation speed of the output shaft 7, $n_1$ is the rotation speed of the input shaft 11, $k_3$ is the planetary gear characteristic parameter of the power-convergence assembly 6, $i_1$ is the transmission ratio of the first gear pair 22, $i_2$ is the transmission ratio of the second gear pair 35, $i_3$ is the transmission ratio of the third gear pair 42, $i_4$ is the transmission ratio of the fourth gear pair 51, $i_e$ is the transmission ratio of the electrical variable transmission assembly 4, and e is the displacement ratio of the hydraulic transmission assembly 3.

Figure 11:
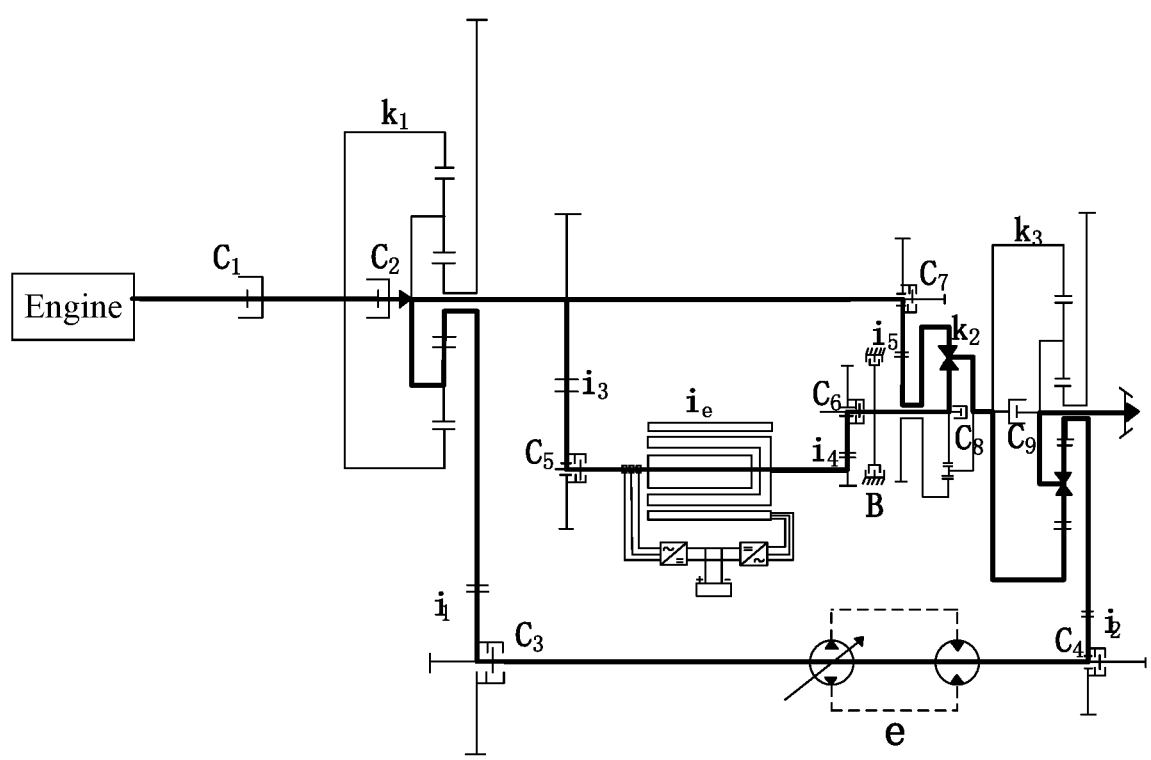
FIG. 11 is a schematic diagram showing the power flow in a mechanical-hydraulic-electrical convergence transmission mode according to the present disclosure.

As shown in FIG. 11, the mechanical-hydraulic-electrical convergence transmission mode is controlled by the following method.

In the mechanical-hydraulic-electrical convergence transmission mode, the first clutch $C_1$ 12, the second clutch $C_2$ 23, the third clutch $C_3$ 31, the fourth clutch $C_4$ 36, the fifth clutch $C_5$ 41, the sixth clutch $C_6$ 52, and the seventh clutch $C_7$ 56 are engaged while the eighth clutch $C_8$ 59, the ninth clutch $C_9$ 64, and the brake B 53 are disengaged. The power-split assembly 2 is fixedly connected as a whole. Power is input from the input shaft 11, then passes through the power-split assembly 2, and is split into two parts. One part of the power is transmitted through the hydraulic transmission assembly 3 to the power-convergence assembly sun gear 62. The other part of the power passes through the power-split assembly planet carrier 25 and is split again, where one part of the power is transmitted through the fifth clutch $C_5$ 41 to the electrical variable transmission input shaft 43, the electrical variable transmission input shaft 43 drives the electrical variable transmission 44 to work, and the power output by the electrical variable transmission 44 is transmitted through the electrical variable transmission output shaft 45 to the mechanical transmission assembly sun gear 58; while the other part of the power is transmitted through the seventh clutch $C_7$ 56 to the mechanical transmission assembly ring gear 57, the two parts of the power are converged at the mechanical transmission assembly planet carrier 510, and the power after convergence is transmitted to the power-convergence assembly ring gear 61. The power transmitted to the power-convergence assembly sun gear 62 and the power transmitted to the power-convergence assembly ring gear 61 are converged at the power-convergence assembly planet carrier 63 and then output from the output shaft 7.

The rotation speed of the output shaft 7 in the hydraulic-electrical convergence transmission mode is calculated by the following method:

$$n_o = \frac{\frac{k_3 \frac{1}{i_3 i_4 i_e} + \frac{k_2}{i_5}}{(1+k_2)} + \frac{e}{i_1 i_2}}{(1+k_3)} n_I$$

where $n_o$ is the rotation speed of the output shaft 7, $n_1$ is the rotation speed of the input shaft 11, $k_2$ is the planetary gear characteristic parameter of the mechanical transmission assembly 5, $k_3$ is the planetary gear characteristic parameter of the power-convergence assembly 6, $i_1$ is the transmission ratio of the first gear pair 22, $i_2$ is the transmission ratio of the second gear pair 35, $i_5$ is the transmission ratio of the third gear pair 42, $i_4$ is the transmission ratio of the fourth gear pair 51, $i_5$ is the transmission ratio of the fifth gear pair 55, $i_e$ is the transmission ratio of the electrical variable transmission assembly 4, and e is the displacement ratio of the hydraulic transmission assembly 3.

To realize switching between the hydraulic transmission mode and the electrical variable transmission mode, stepless speed regulation of switching between the multiple transmission modes is implemented by adjusting the displacement ratio of the hydraulic transmission assembly, adjusting the transmission ratio of the electrical variable transmission assembly, and controlling engagement of the clutches and the brake B.

The stepless speed regulation of switching between the multiple transmission modes involves the following situations:

"hydraulic transmission mode"-"hydraulic-electrical convergence transmission mode"-"mechanical-hydraulic-electrical convergence transmission mode or hydraulic transmission mode"-"mechanical transmission mode"-"hydraulic-mechanical convergence transmission mode";

"hydraulic transmission mode"-"mechanical-electrical convergence transmission mode"-"electrical variable transmission mode"-"hydraulic-electrical split transmission mode"; "hydraulic transmission mode"-"hydraulic-mechanical-electrical split transmission mode"; "hydraulic transmission mode"-"hydraulic-mechanical split transmission mode".

For example:

The main parameters are: $i_1 i_2=1$, $i_3 i_4=1$, $i_5=2$, $k_1=3$, $k_2=2$, $k_3=3$, and $i_e \in [0.74, 3.69]$.

In a first transmission mode switching process: "hydraulic transmission mode"-"hydraulic-electrical convergence transmission mode"-"mechanical-hydraulic-electrical convergence transmission mode or hydraulic transmission mode"-"mechanical transmission mode"-"hydraulic-mechanical convergence transmission mode", the output-input speed relationship in the hydraulic transmission mode is:

$$n_o = \frac{e}{i_1 i_2} n_I = e n_I;$$

the output-input speed relationship in the hydraulic-electrical convergence transmission mode is:

$$n_o = \frac{\frac{k_3}{i_3 i_4 i_e} + \frac{e}{i_1 i_2}}{(1+k_3)} n_I = \frac{\frac{3}{i_e}+e}{4} n_I;$$

the output-input speed relationship in the mechanical-hydraulic-electrical convergence transmission mode is:

$$n_o = \frac{k_3 \frac{\frac{1}{i_3 i_4 i_e}+\frac{k_2}{i_5}}{(1+k_2)} + \frac{e}{i_1 i_2}}{(1+k_3)} n_I = \frac{\frac{1}{i_e}+e+1}{4} n_I;$$

the output-input speed relationship in the mechanical transmission mode is:

$$n_o = \frac{k_2}{(1+k_2) i_5} n_I = \frac{1}{3} n_I;$$

the output-input speed relationship in the hydraulic-mechanical convergence transmission mode is:

$$n_o = \frac{\frac{k_2 k_3}{(1+k_2) i_5}+\frac{e}{i_1 i_2}}{(1+k_3)} n_I = \frac{1+e}{4} n_I.$$

Figure 12:
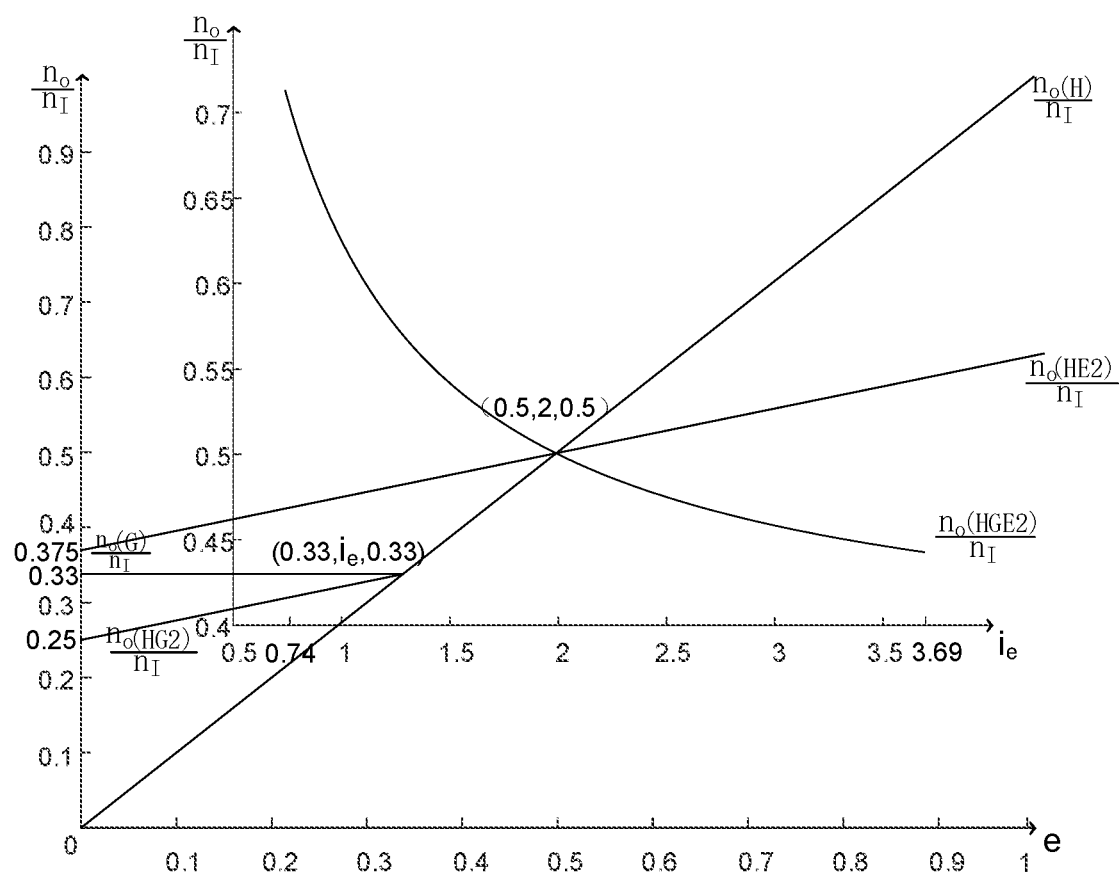
FIG. 12 is a diagram showing relationships between output and input speeds in a multi-mode switching process "hydraulic transmission mode"-"hydraulic-electrical convergence transmission mode"-"mechanical-hydraulic-electrical convergence transmission mode or hydraulic transmission mode"-"mechanical transmission mode"-"hydraulic-mechanical convergence transmission mode" according to the present disclosure.

As shown in FIG. 12, the hydraulic transmission mode is adopted for startup, and the output speed increases linearly with the increase of the displacement ratio e of the hydraulic transmission mechanism. When e=0.5, the hydraulic transmission mode reaches a positive value $0.5n_1$. When e=0.5, $i_e=2.0$, $e \in [0,1]$, and $i_e \in [0.74, 3.69]$, the hydraulic transmission mode, the hydraulic-electrical convergence transmission mode, and the mechanical-hydraulic-electrical convergence transmission mode can be switched to each other. If the mode is synchronously switched to the mechanical-hydraulic-electrical convergence transmission mode, when e=0.5, $i_e$ changes from 3.69 to 0.74, and the rotation speed $n_o$ of the output shaft in the mechanical-hydraulic-electrical convergence transmission mode increases nonlinearly from $0.44n_1$ to $0.71n_1$. If the mode is synchronously switched to the hydraulic-electrical convergence transmission mode, when $i_e=2.0$, e changes from 0 to 1, and the rotation speed $n_o$ of the output shaft in the hydraulic-electrical convergence transmission mode increases nonlinearly from $0.375n_1$ to $0.625n_1$. Or, the hydraulic transmission mode is adopted for startup, and the output speed increases linearly with the increase of the displacement ratio e of the hydraulic transmission mechanism. When e=0.33, the mode can be synchronously switched to the mechanical transmission mode or the hydraulic-mechanical convergence transmission mode.

In a second transmission mode switching process: "hydraulic transmission mode"-"mechanical-electrical convergence transmission mode"-"electrical variable transmission mode"-"hydraulic-electrical split transmission mode", the output-input speed relationship in the hydraulic transmission mode is:

$$n_o = \frac{e}{i_1 i_2} n_I = e n_I;$$

the output-input speed relationship in the mechanical-electrical convergence transmission mode is:

$$n_o = \frac{\frac{1}{i_3 i_4 i_e}+\frac{k_2}{i_5}}{(1+k_2)} n_I = \frac{\frac{1}{i_e}+1}{3} n_I;$$

the output-input speed relationship in the electrical variable transmission is:

$$n_o = \frac{1}{i_3 i_4 i_e} n_I = \frac{1}{i_e} n_I;$$

the output-input speed relationship in the hydraulic-electrical split transmission mode is:

$$n_o = \frac{k_1}{i_3 i_4 i_e (1+k_1) - \frac{i_1 i_2}{e}} n_I = \frac{3}{4i_e - \frac{1}{e}} n_I.$$

Figure 13:
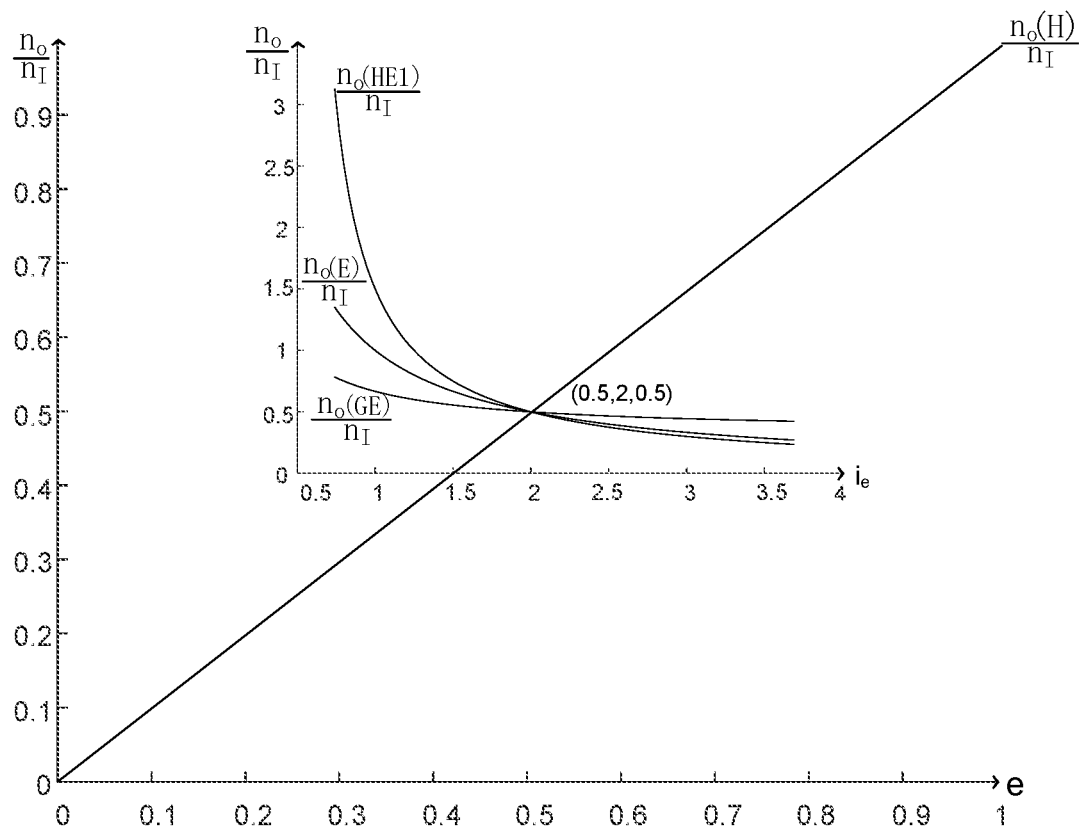
FIG. 13 is a diagram showing relationships between output and input speeds in a multi-mode switching process "hydraulic transmission mode"-"mechanical-electrical convergence transmission mode"-"electrical variable transmission mode"-"hydraulic-electrical split transmission mode" according to the present disclosure.

As shown in FIG. 13, the hydraulic transmission mode is adopted for startup, and the output speed increases linearly with the increase of the displacement ratio e of the hydraulic transmission mechanism. When e=1, the hydraulic transmission mode reaches a positive value $n_1$. When e=0.5, the hydraulic transmission mode can be synchronously switched to the mechanical-electrical convergence transmission mode, the electrical variable transmission mode, or the hydraulic-electrical split transmission mode.

In a third transmission mode switching process: "hydraulic transmission mode"-"hydraulic-mechanical-electrical split transmission mode", the output-input speed relationship in the hydraulic transmission mode is:

$$n_o = \frac{e}{i_1 i_2} n_I = e n_I;$$

the output-input speed relationship in the hydraulic-mechanical-electrical split transmission mode is:

$$n_o = \frac{k_1}{\frac{(1+k_2)(1+k_1)}{\frac{1}{i_3 i_4 i_e} + \frac{k_2}{i_5}} - \frac{i_1 i_2}{e}} n_I = \frac{3}{\frac{12}{\frac{1}{i_e}+1} - \frac{1}{e}} n_I.$$

Figure 14:
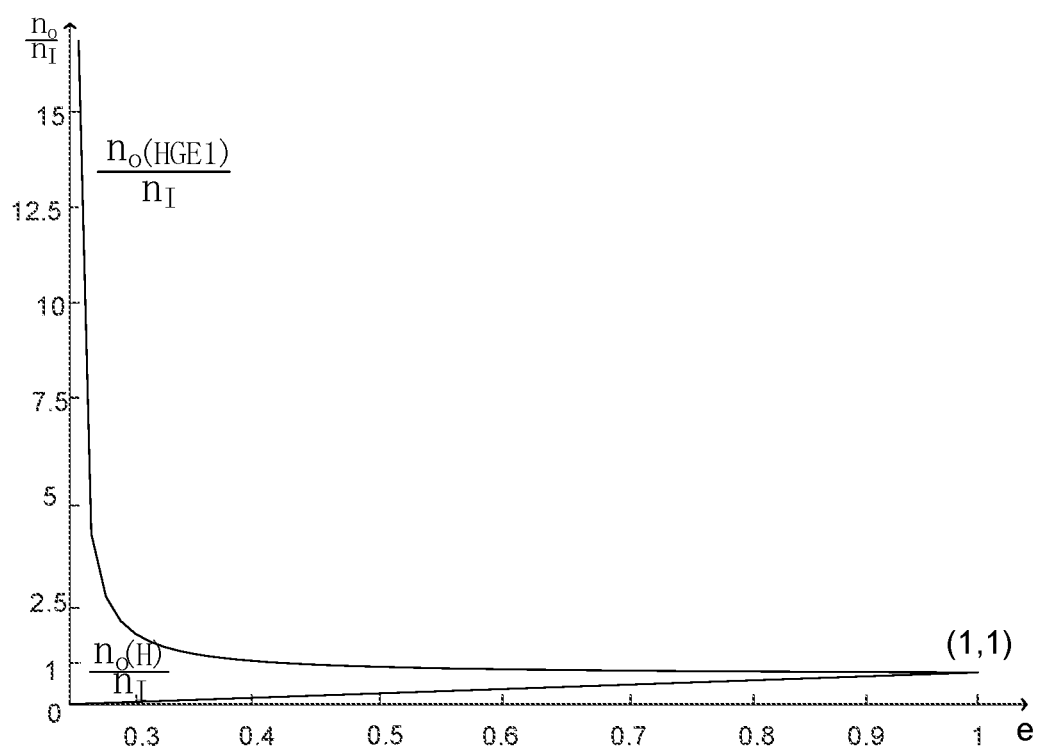
FIG. 14 is a diagram showing relationships between output and input speeds in a multi-mode switching process "hydraulic transmission mode"-"hydraulic-mechanical-electrical split transmission mode" according to the present disclosure.

As shown in FIG. 14, the hydraulic transmission mode is adopted for startup, and the output speed increases linearly with the increase of the displacement ratio e of the hydraulic transmission mechanism. When e=1, the hydraulic transmission mode reaches a positive value $n_1$. When e=0.5 and $i_e$=0.5, the hydraulic transmission mode can be synchronously switched to the hydraulic-mechanical-electrical split transmission mode.

In a fourth transmission mode switching process: "hydraulic transmission mode"-"hydraulic-mechanical split transmission mode", the output-input speed relationship in the hydraulic transmission mode is:

$$n_o = \frac{e}{i_1 i_2} n_I = e n_I;$$

the output-input speed relationship in the hydraulic-mechanical split transmission mode is:

$$n_o = \frac{k_1}{\frac{(1+k_2)i_5(1+k_1)}{k_2} - \frac{i_1 i_2}{e}} n_I = \frac{3}{12 - \frac{1}{e}} n_I.$$

Figure 15:
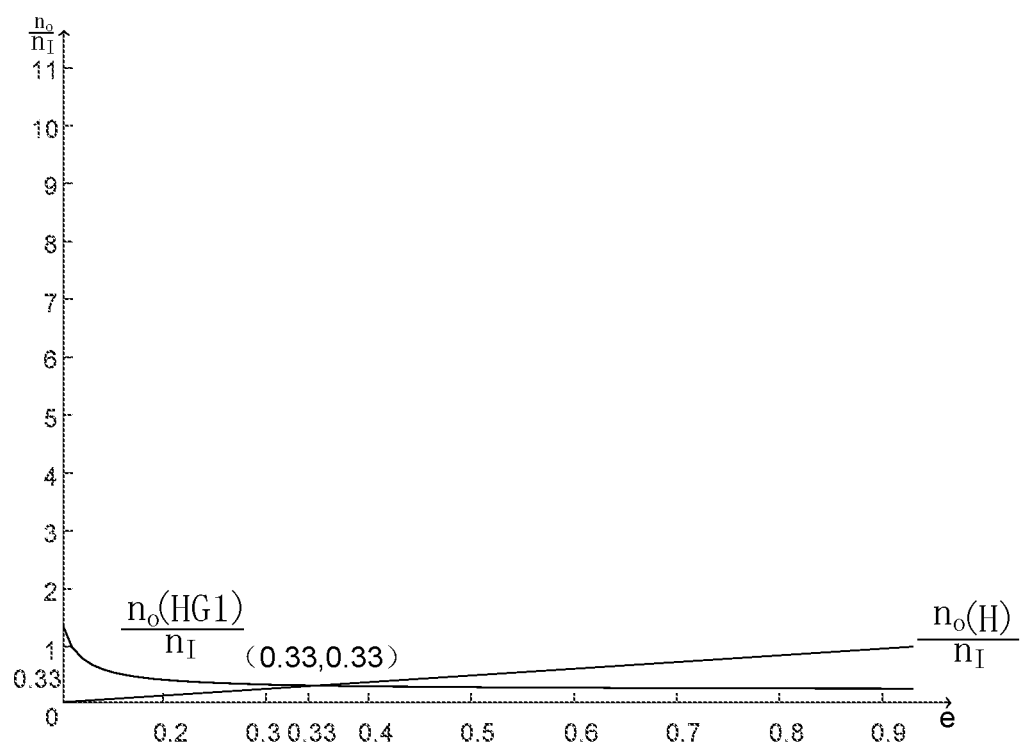
FIG. 15 is a diagram showing relationships between output and input speeds in a multi-mode switching process "hydraulic transmission mode"-"hydraulic-mechanical split transmission mode" according to the present disclosure.

As shown in FIG. 15, the hydraulic transmission mode is adopted for startup, and the output speed increases linearly with the increase of the displacement ratio e of the hydraulic transmission mechanism. When e=0.33, the hydraulic transmission mode reaches a positive value $0.33n_1$ and the hydraulic transmission mode can be synchronously switched to the hydraulic-mechanical split transmission mode.

All the embodiments in the specification are described in a progressive manner, each embodiment focuses on the differences from the other embodiments, and reference can be made to each other for the same or similar parts of the embodiments. Since the device disclosed herein corresponds to the method disclosed in the embodiments, the device is described simply and reference can be made to the description about the method for the related parts.

Persons skilled in the art can implement or use the present disclosure according to the description of the disclosed embodiments. It is apparent to persons skilled in the art that various modifications can be made to these embodiments, and general principles defined in this specification can be implemented in other embodiments without departing from the spirit or scope of the present disclosure. Therefore, the present disclosure is not limited by the embodiments described herein, but has the broadest scope conforming to the principles and innovative features disclosed by this specification.

What is claimed is:

1. A mechanical-electrical-hydraulic composite transmission device, comprising:
   an input shaft assembly comprising an input shaft and a first clutch;
   a power-split assembly comprising a power-split assembly input shaft, a first gear pair, a second clutch, a power-split assembly ring gear, a power-split assembly planet carrier, and a power-split assembly sun gear, wherein the power-split assembly ring gear is connected to the power-split assembly input shaft, the power-split assembly input shaft is connected to the input shaft through the first clutch, and the power-split assembly ring gear is connected to the power-split assembly planet carrier through the second clutch;
   a hydraulic transmission assembly comprising a third clutch, a variable displacement pump, a hydraulic pipe, a fixed displacement motor, a second gear pair, and a fourth clutch, wherein an input end of the hydraulic transmission assembly is connected to the power-split assembly sun gear, the input end of the hydraulic transmission assembly is connected to the variable displacement pump through the third clutch, the variable displacement pump outputs high-pressure oil to the fixed displacement motor through the hydraulic pipe, and the second gear pair is connected to an output shaft of the fixed displacement motor through the fourth clutch;
   an electrical variable transmission assembly comprising a fifth clutch, a third gear pair, an electrical variable transmission input shaft, an electrical variable transmission, and an electrical variable transmission output shaft, wherein the power-split assembly planet carrier is connected to the electrical variable transmission input shaft through the fifth clutch;
   a mechanical transmission assembly comprising a fourth gear pair, a sixth clutch, a brake, a mechanical transmission assembly input shaft, a fifth gear pair, a seventh clutch, a mechanical transmission assembly ring gear, a mechanical transmission assembly sun gear, an eighth clutch, a mechanical transmission assembly planet carrier, and a mechanical transmission assembly output shaft, wherein the electrical variable transmission output shaft is connected to the mechanical transmission assembly sun gear through the sixth clutch, the brake is connected to the mechanical transmission assembly sun gear, the power-split assembly planet carrier is connected to the mechanical transmission assembly ring gear through the seventh clutch, and the mechanical transmission assembly sun gear is connected to the mechanical transmission assembly planet carrier through the eighth clutch;
   a power-convergence assembly comprising a power-convergence assembly ring gear, a power-convergence assembly sun gear, a power-convergence assembly planet carrier, and a ninth clutch, wherein the power-convergence assembly ring gear is fixedly connected to the mechanical transmission assembly output shaft, the power-convergence assembly ring gear is connected to the power-convergence assembly planet carrier through the ninth clutch, and the power-convergence assembly sun gear is connected to an output end of the hydraulic transmission assembly; and an output shaft, wherein the output shaft is connected to the power-convergence assembly planet carrier.

2. A control method of the mechanical-electrical-hydraulic composite transmission device according to claim 1, wherein three types of transmission modes comprising single transmission modes, power-split composite transmission modes, and power-convergence composite transmission modes are implemented by controlling engagement and disengagement of the clutches and the brake, wherein the single transmission modes comprise a hydraulic transmission mode, a mechanical transmission mode, and an electrical variable transmission mode; the power-split composite transmission modes comprise a hydraulic-mechanical split transmission mode, a hydraulic-electrical split transmission mode, and a hydraulic-mechanical-electrical split transmission mode; and the power-convergence composite transmission modes comprise a mechanical-electrical convergence transmission mode, a hydraulic-mechanical convergence transmission mode, a hydraulic-electrical convergence transmission mode, and a mechanical-hydraulic-electrical convergence transmission mode.

3. The control method of the mechanical-electrical-hydraulic composite transmission device according to claim 2, wherein the single transmission modes are controlled by the following methods:

in the hydraulic transmission mode, engaging the first clutch, the second clutch, the third clutch, the fourth clutch, and the ninth clutch while disengaging the fifth clutch, the sixth clutch, the seventh clutch, the eighth clutch, and the brake, so that power is input from the input shaft and then passes through the first gear pair to drive the variable displacement pump to work, the variable displacement pump outputs high-pressure oil to drive the fixed displacement motor to rotate, and the power output from an output end of the fixed displacement motor is transmitted through the second gear pair and then output from the output shaft;

in the mechanical transmission mode, engaging the first clutch, the second clutch, the seventh clutch, the ninth clutch, and the brake while disengaging the third clutch, the fourth clutch, the fifth clutch, the sixth clutch, and the eighth clutch, so that power is input from the input shaft and then sequentially passes through the first clutch, the second clutch, and the seventh clutch to drive the mechanical transmission assembly ring gear to work, and the power output from the mechanical transmission assembly ring gear is transmitted through the mechanical transmission assembly planet carrier and then output from the output shaft; and in the electrical variable transmission mode, engaging the first clutch, the second clutch, the fifth clutch, the sixth clutch, the eighth clutch, and the ninth clutch while disengaging the third clutch, the fourth clutch, the seventh clutch, and the brake, wherein the power-split assembly and the power-convergence assembly are each fixedly connected as a whole, so that power is input from the input shaft, then transmitted through the power-split assembly, the electrical variable transmission assembly, and the power-convergence assembly, and output from the output shaft.

4. The control method of the mechanical-electrical-hydraulic composite transmission device according to claim 3, wherein a rotation speed $n_o$ of the output shaft in the single transmission modes is calculated by the following methods:

in the hydraulic transmission mode:

$$n_o = \frac{e}{i_1 i_2} n_I$$

wherein $n_o$ is the rotation speed of the output shaft, $n_1$ is a rotation speed of the input shaft, e is a displacement ratio of the hydraulic transmission assembly, $i_1$ is a transmission ratio of the first gear pair, and $i_2$ is a transmission ratio of the second gear pair;

in the mechanical transmission mode:

$$n_o = \frac{k_2}{(1+k_2)i_5} n_I$$

wherein $n_o$ is the rotation speed of the output shaft, $n_1$ is the rotation speed of the input shaft, $i_5$ is a transmission ratio of the fifth gear pair, and $k_2$ is a planetary gear characteristic parameter of the mechanical transmission assembly; and in the electrical variable transmission mode:

$$n_o = \frac{1}{i_3 i_4 i_e} n_I$$

wherein $n_o$ is the rotation speed of the output shaft, $n_1$ is the rotation speed of the input shaft, $i_3$ is a transmission ratio of the third gear pair, $i_4$ is a transmission ratio of the fourth gear pair, and $i_e$ is a transmission ratio of the electrical variable transmission assembly.

5. The control method of the mechanical-electrical-hydraulic composite transmission device according to claim 2, wherein the power-split composite transmission modes are controlled by the following methods:

in the hydraulic-mechanical split transmission mode, engaging the first clutch, the third clutch, the fourth clutch, the seventh clutch, the ninth clutch, and the brake while disengaging the second clutch, the fifth clutch, the sixth clutch, and the eighth clutch, so that power is input from the input shaft, then passes through the power-split assembly input shaft to the power-split assembly ring gear, and is split into two parts: one part of the power is transmitted through the power-split assembly sun gear and the hydraulic transmission assembly to the power-convergence assembly sun gear, while the other part of the power is transmitted through the power-split assembly planet carrier, the mechanical transmission assembly ring gear, and the mechanical transmission assembly planet carrier to the power-convergence assembly ring gear; since the power-convergence assembly is fixedly connected as a whole, the power transmitted to the power-convergence assembly sun gear and the power transmitted to the power-convergence assembly ring gear pass through the power-convergence assembly and are output from the output shaft;

in the hydraulic-electrical split transmission mode, engaging the first clutch, the third clutch, the fourth clutch, the fifth clutch, the sixth clutch, the eighth clutch, and the ninth clutch while disengaging the second clutch, the seventh clutch, and the brake, so that power is input from the input shaft, then passes through the power-split assembly input shaft to the power-split assembly ring gear, and is split into two parts: one part of the power is transmitted through the power-split assembly sun gear and the hydraulic transmission assembly to the power-convergence assembly sun gear, while the other part of the power is transmitted through the power-split assembly planet carrier to the electrical variable transmission input shaft, the electrical variable transmission input shaft drives the electrical variable transmission to work, and the power output by the electrical variable transmission is transmitted through the electrical variable transmission output shaft to the power-convergence assembly ring gear; since the power-convergence assembly is fixedly connected as a whole, the power transmitted to the power-convergence assembly sun gear and the power transmitted to the power-convergence assembly ring gear pass through the power-convergence assembly and are output from the output shaft; and in the hydraulic-mechanical-electrical split transmission mode, engaging the first clutch, the third clutch, the fourth clutch, the fifth clutch, the sixth clutch, the seventh clutch, and the ninth clutch while disengaging the second clutch, the eighth clutch, and the brake B, so that power is input from the input shaft, then passes through the power-split assembly input shaft to the power-split assembly ring gear, and is split into two parts: one part of the power is transmitted through the power-split assembly sun gear and the hydraulic transmission assembly to the power-convergence assembly sun gear, while the other part of the power passes through the power-split assembly planet carrier and is split again, wherein one part of the power is transmitted through the fifth clutch to the electrical variable transmission input shaft, the electrical variable transmission input shaft drives the electrical variable transmission to work, and the power output by the electrical variable transmission is transmitted through the electrical variable transmission output shaft to the mechanical transmission assembly sun gear; while the other part of the power is transmitted through the seventh clutch to the mechanical transmission assembly ring gear, the two parts of the power are converged at the mechanical transmission assembly planet carrier, and the power after convergence is transmitted to the power-convergence assembly ring gear; since the power-convergence assembly is fixedly connected as a whole, the power transmitted to the power-convergence assembly sun gear and the power transmitted to the power-convergence assembly ring gear pass through the power-convergence assembly and are output from the output shaft.

6. The control method of the mechanical-electrical-hydraulic composite transmission device according to claim 5, wherein a rotation speed $n_o$ of the output shaft in the power-split composite transmission modes is calculated by the following methods:

in the hydraulic-mechanical split transmission mode:

$$n_o = \frac{k_1}{\frac{(1+k_2)i_5(1+k_1)}{k_2} - \frac{i_1 i_2}{e}} n_I$$

wherein $n_o$ is the rotation speed of the output shaft, $n_1$ is a rotation speed of the input shaft, $k_1$ is a planetary gear characteristic parameter of the power-split assembly, $k_2$ is a planetary gear characteristic parameter of the mechanical transmission assembly, $i_1$ is a transmission ratio of the first gear pair, $i_2$ is a transmission ratio of the second gear pair, $i_5$ is a transmission ratio of the fifth gear pair, and e is a displacement ratio of the hydraulic transmission assembly;

in the hydraulic-electrical split transmission mode:

$$n_o = \frac{k_1}{i_3 i_4 i_e(1+k_1) - \frac{i_1 i_2}{e}} n_I$$

wherein $n_o$ is the rotation speed of the output shaft, $n_1$ is the rotation speed of the input shaft, $k_1$ is the planetary gear characteristic parameter of the power-split assembly, $i_1$ is the transmission ratio of the first gear pair, $i_2$ is the transmission ratio of the second gear pair, $i_5$ is a transmission ratio of the third gear pair, $i_4$ is a transmission ratio of the fourth gear pair, $i_e$ is a transmission ratio of the electrical variable transmission assembly, and e is the displacement ratio of the hydraulic transmission assembly; and in the hydraulic-mechanical-electrical split transmission mode:

$$n_o = \frac{k_1}{\frac{(1+k_2)(1+k_1)}{\frac{1}{i_3 i_4 i_e} + \frac{k_2}{i_5}} - \frac{i_1 i_2}{e}} n_I$$

wherein $n_o$ is the rotation speed of the output shaft, $n_1$ is the rotation speed of the input shaft, $k_1$ is the planetary gear characteristic parameter of the power-split assembly, $k_2$ is the planetary gear characteristic parameter of the mechanical transmission assembly, $i_1$ is the transmission ratio of the first gear pair, $i_2$ is the transmission ratio of the second gear pair, $i_5$ is the transmission ratio of the third gear pair, $i_4$ is the transmission ratio of the fourth gear pair, $i_5$ is the transmission ratio of the fifth gear pair, $i_e$ is the transmission ratio of the electrical variable transmission assembly, and e is the displacement ratio of the hydraulic transmission assembly.

7. The control method of the mechanical-electrical-hydraulic composite transmission device according to claim 2, wherein the power-convergence composite transmission modes are controlled by the following methods:

in the mechanical-electrical convergence transmission mode, engaging the first clutch, the second clutch, the fifth clutch, the sixth clutch, the seventh clutch, and the ninth clutch while disengaging the third clutch, the fourth clutch, the eighth clutch, and the brake, wherein the power-split assembly and the power-convergence assembly are each fixedly connected as a whole, so that power is input from the input shaft, then passes through the power-split assembly, and is split into two parts: one part of the power is transmitted through the fifth clutch to the electrical variable transmission input shaft, the electrical variable transmission input shaft drives the electrical variable transmission to work, and the power output by the electrical variable transmission is transmitted through the electrical variable transmission output shaft to the mechanical transmission assembly sun gear; while the other part of the power is transmitted through the seventh clutch to the mechanical transmission assembly ring gear, the two parts of the power are converged at the mechanical transmission assembly planet carrier, and the power after convergence is transmitted through the power-convergence assembly and then output from the output shaft;

in the hydraulic-mechanical convergence transmission mode, engaging the first clutch, the second clutch, the third clutch, the fourth clutch, the seventh clutch, and the brake while disengaging the fifth clutch, the sixth clutch, and the ninth clutch, wherein the power-split assembly is fixedly connected as a whole, so that power is input from the input shaft, then passes through the power-split assembly, and is split into two parts: one part of the power is transmitted through the hydraulic transmission assembly to the power-convergence assembly sun gear, while the other part of the power is transmitted through the power-split assembly planet carrier, the mechanical transmission assembly ring gear, and the mechanical transmission assembly planet carrier to the power-convergence assembly ring gear; the power transmitted to the power-convergence assembly sun gear and the power transmitted to the power-convergence assembly ring gear are converged at the power-convergence assembly planet carrier and then output from the output shaft;

in the hydraulic-electrical convergence transmission mode, engaging the first clutch, the second clutch, the third clutch, the fourth clutch, the fifth clutch, the sixth clutch, and the eighth clutch while disengaging the seventh clutch, the ninth clutch, and the brake, wherein the power-split assembly is fixedly connected as a whole, so that power is input from the input shaft, then passes through the power-split assembly, and is split into two parts: one part of the power is transmitted through the hydraulic transmission assembly to the power-convergence assembly sun gear, while the other part of the power is transmitted through the power-split assembly planet carrier to the electrical variable transmission input shaft, the electrical variable transmission input shaft drives the electrical variable transmission to work, and the power output by the electrical variable transmission is transmitted through the electrical variable transmission output shaft to the power-convergence assembly ring gear; the power transmitted to the power-convergence assembly sun gear and the power transmitted to the power-convergence assembly ring gear are converged at the power-convergence assembly planet carrier and then output from the output shaft; and in the mechanical-hydraulic-electrical convergence transmission mode, engaging the first clutch, the second clutch, the third clutch, the fourth clutch, the fifth clutch, the sixth clutch, and the seventh clutch while disengaging the eighth clutch, the ninth clutch, and the brake, wherein the power-split assembly is fixedly connected as a whole, so that power is input from the input shaft, then passes through the power-split assembly, and is split into two parts: one part of the power is transmitted through the hydraulic transmission assembly to the power-convergence assembly sun gear, while the other part of the power passes through the power-split assembly planet carrier and is split again, wherein one part of the power is transmitted through the fifth clutch to the electrical variable transmission input shaft, the electrical variable transmission input shaft drives the electrical variable transmission to work, and the power output by the electrical variable transmission is transmitted through the electrical variable transmission output shaft to the mechanical transmission assembly sun gear; while the other part of the power is transmitted through the seventh clutch to the mechanical transmission assembly ring gear, the two parts of the power are converged at the mechanical transmission assembly planet carrier, and the power after convergence is transmitted to the power-convergence assembly ring gear; the power transmitted to the power-convergence assembly sun gear and the power transmitted to the power-convergence assembly ring gear are converged at the power-convergence assembly planet carrier and then output from the output shaft.

8. The control method of the mechanical-electrical-hydraulic composite transmission device according to claim 7, wherein a rotation speed $n_o$ of the output shaft in the power-convergence composite transmission modes is calculated by the following methods:

in the mechanical-electrical convergence transmission mode:

$$n_o = \frac{\frac{1}{i_3 i_4 i_e} + \frac{k_2}{i_5}}{(1 + k_2)} n_I$$

wherein $n_o$ is the rotation speed of the output shaft, $n_1$ is a rotation speed of the input shaft, $k_2$ is a planetary gear characteristic parameter of the mechanical transmission assembly, $i_5$ is a transmission ratio of the third gear pair, $i_4$ is a transmission ratio of the fourth gear pair, $i_5$ is a transmission ratio of the fifth gear pair, and $i_e$ is a transmission ratio of the electrical variable transmission assembly;

in the hydraulic-mechanical convergence transmission mode:

$$n_o = \frac{\frac{k_2 k_3}{(1 + k_2) i_5} + \frac{e}{i_1 i_2}}{(1 + k_3)} n_I$$

wherein $n_o$ is the rotation speed of the output shaft, $n_1$ is the rotation speed of the input shaft, $k_2$ is the planetary gear characteristic parameter of the mechanical transmission assembly, $k_3$ is a planetary gear characteristic parameter of the power-convergence assembly, $i_1$ is a transmission ratio of the first gear pair, $i_2$ is a transmission ratio of the second gear pair, and e is a displacement ratio of the hydraulic transmission assembly;

in the hydraulic-electrical convergence transmission mode:

$$n_o = \frac{\frac{k_3}{i_3 i_4 i_e} + \frac{e}{i_1 i_2}}{(1 + k_3)} n_I$$

wherein $n_o$ is the rotation speed of the output shaft, $n_1$ is the rotation speed of the input shaft, $k_3$ is the planetary gear characteristic parameter of the power-convergence assembly, $i_1$ is the transmission ratio of the first gear pair, $i_2$ is the transmission ratio of the second gear pair, $i_3$ is the transmission ratio of the third gear pair, $i_4$ is the transmission ratio of the fourth gear pair, $i_e$ is the transmission ratio of the electrical variable transmission assembly, and e is the displacement ratio of the hydraulic transmission assembly; and in the mechanical-hydraulic-electrical convergence transmission mode:

$$n_o = \frac{k_3 \frac{\frac{1}{i_3 i_4 i_e} + \frac{k_2}{i_5}}{(1+k_2)} + \frac{e}{i_1 i_2}}{(1+k_3)} n_I$$

wherein $n_o$ is the rotation speed of the output shaft, $n_1$ is the rotation speed of the input shaft, $k_2$ is the planetary gear characteristic parameter of the mechanical transmission assembly, $k_3$ is the planetary gear characteristic parameter of the power-convergence assembly, $i_1$ is the transmission ratio of the first gear pair, $i_2$ is the transmission ratio of the second gear pair, $i_3$ is the transmission ratio of the third gear pair, $i_4$ is the transmission ratio of the fourth gear pair, $i_5$ is the transmission ratio of the fifth gear pair, $i_e$ is the transmission ratio of the electrical variable transmission assembly, and e is the displacement ratio of the hydraulic transmission assembly.

9. The control method of the mechanical-electrical-hydraulic composite transmission device according to claim 2, wherein stepless speed regulation of switching between the multiple transmission modes is implemented by adjusting the displacement ratio of the hydraulic transmission assembly, adjusting the transmission ratio of the electrical variable transmission assembly, and controlling engagement of the clutches and the brake.

10. The control method of the mechanical-electrical-hydraulic composite transmission device according to claim 9, wherein stepless speed regulation of switching between the multiple transmission modes involves the following situations:

"hydraulic transmission mode"-"hydraulic-electrical convergence transmission mode"-"mechanical-hydraulic-electrical convergence transmission mode or hydraulic transmission mode"-"mechanical transmission mode"-"hydraulic-mechanical convergence transmission mode";

"hydraulic transmission mode"-"mechanical-electrical convergence transmission mode"-"electrical variable transmission mode"-"hydraulic-electrical split transmission mode";

"hydraulic transmission mode"-"hydraulic-mechanical-electrical split transmission mode"; and "hydraulic transmission mode"-"hydraulic-mechanical split transmission mode".

\* \* \* \* \*